US012795504B2

(12) United States Patent
Velev et al.

(10) Patent No.: US 12,795,504 B2
(45) Date of Patent: Nov. 10, 2026

(54) CONFIGURING PROTOCOL DATA UNIT SESSIONS

(71) Applicant: Lenovo (Singapore) Pte. Ltd., New Tech Park (SG)

(72) Inventors: Genadi Velev, Darmstadt (DE); Emmanouil Pateromichelakis, Viersen (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 281 days.

(21) Appl. No.: 18/698,577

(22) PCT Filed: Nov. 11, 2021

(86) PCT No.: PCT/EP2021/081444
§ 371 (c)(1),
(2) Date: Apr. 4, 2024

(87) PCT Pub. No.: WO2023/057081
PCT Pub. Date: Apr. 13, 2023

(65) Prior Publication Data

US 2024/0334307 A1 Oct. 3, 2024

(30) Foreign Application Priority Data

Oct. 4, 2021 (GR) .............................. 20210100669

(51) Int. Cl.
*H04W 40/24* (2009.01)
*H04L 67/141* (2022.01)
(Continued)

(52) U.S. Cl.
CPC ......... *H04W 40/248* (2013.01); *H04L 67/141* (2013.01); *H04W 8/183* (2013.01); *H04W 76/10* (2018.02); *H04W 80/12* (2013.01)

(58) Field of Classification Search
CPC ..... H04W 80/12; H04W 48/18; H04W 76/10; H04W 76/12; H04W 40/248; H04W 8/183
See application file for complete search history.

(56) References Cited

U.S. PATENT DOCUMENTS 11,528,761 B2 * 12/2022 Zong ....................... H04W 8/02
11,910,299 B2 * 2/2024 Gundavelli ........... H04W 48/16
(Continued)

OTHER PUBLICATIONS

PCT/EP2021/081444, "Notification of Transmittal of the International Search Report and the Written Opinion of the International Searching Authority, or the Declaration", International Searching Authority, Jun. 21, 2022, pp. 1-24.
(Continued)

*Primary Examiner* — Khalid W Shaheed
(74) *Attorney, Agent, or Firm* — Kunzler Needham Hilton

(57) ABSTRACT

Apparatuses, methods, and systems are disclosed for configuring protocol data unit sessions. One method includes receiving configuration information from a network. The configuration information includes: a first indication about whether to accept at least one high layer parameter requested by a high layer client of the device, wherein the at least one high layer parameter is applicable for protocol data unit session establishment or for updating stored user equipment route selection policy rules, or a combination thereof; and mapping information of the at least one high layer parameter of the first indication to at least one network parameter that is valid in the network. The method includes storing the configuration information. The method includes applying the configuration information in response to receiving a first request from the high layer client.

20 Claims, 11 Drawing Sheets

(51) Int. Cl.

| | |
|---|---|
| ***H04W 8/18*** | (2009.01) |
| ***H04W 76/10*** | (2018.01) |
| *H04W 80/12* | (2009.01) |

(56) References Cited

U.S. PATENT DOCUMENTS

| | | | | |
|---|---|---|---|---|
| 2021/0037380 | A1 | 2/2021 | Lee et al. | |
| 2021/0126828 | A1* | 4/2021 | Vidyashankar | H04L 41/28 |
| 2022/0311826 | A1* | 9/2022 | Chauhan | H04W 8/26 |
| 2023/0319528 | A1 | 10/2023 | Pateromichelakis et al. | |

OTHER PUBLICATIONS

Kddi, "Essential correction and clarification about user preference for URSP", SA WG2 Meeting #128 S2-187698, Aug. 20-24, 2018, pp. 1-4.

Lenovo, Motorola Mobility, "Network Slice Capability Management functional model", 3GPP TSG-SA6 Meeting #42- bis-e S6-211076, Apr. 12-20, 2021, pp. 4-14.

3GPP "3rd Generation Partnership Project; Technical Specification Group Services and System Aspects; Vocabulary for 3GPP Specifications (Release 17)", 3GPP TR 21.905 V17.0.0, Jul. 2020, pp. 1-65.

3GPP "3rd Generation Partnership Project; Technical Specification Group Services and System Aspects; Service Enabler Architecture Layer for Verticals (SEAL); Functional architecture and information flows; (Release 17)", 3GPP TS 23.434 V17.3.0, Sep. 2021, pp. 1-181.

3GPP "3rd Generation Partnership Project; Technical Specification Group Services and System Aspects; System architecture for the 5G System (5GS); Stage 2 (Release 17)", 3GPP TS 23.501 V17.2.0, Sep. 2021, pp. 1-542.

3GPP "3rd Generation Partnership Project; Technical Specification Group Services and System Aspects; Procedures for the 5G System (5GS); Stage 2 (Release 17)", 3GPP TS 23.502 V17.2.1, Sep. 2021, pp. 1-712.

3GPP "3rd Generation Partnership Project; Technical Specification Group Services and System Aspects; Policy and charging control framework for the 5G System (5GS); Stage 2 (Release 17)", 3GPP TS 23.503 V17.2.0, Sep. 2021, pp. 1-141.

3GPP "3rd Generation Partnership Project; Technical Specification Group Services and System Aspects; Management and orchestration; Concepts, use cases and requirements (Release 17)", 3GPP TS 28.530 V17.1.0, Mar. 2021, pp. 1-32.

3GPP "3rd Generation Partnership Project; Technical Specification Group Radio Access Network; NR; NR and NG-RAN Overall Description; Stage 2 (Release 16)", 3GPP TS 38.300 V16.7.0, Sep. 2021, pp. 1-152.

* cited by examiner

CONFIGURING PROTOCOL DATA UNIT SESSIONS

FIELD

The subject matter disclosed herein relates generally to wireless communications and more particularly relates to configuring protocol data unit sessions.

BACKGROUND

In certain wireless communications networks, there may not be slice continuity for a mobile device moving from one area to another. This may limit the operation of the mobile device.

BRIEF SUMMARY

Methods for configuring protocol data unit sessions are disclosed. Apparatuses and systems also perform the functions of the methods. One embodiment of a method includes receiving configuration information from a network. The configuration information includes: a first indication about whether to accept at least one high layer parameter requested by a high layer client of the device, wherein the at least one high layer parameter is applicable for protocol data unit session establishment or for updating stored user equipment route selection policy rules, or a combination thereof; and mapping information of the at least one high layer parameter of the first indication to at least one network parameter that is valid in the network. In some embodiments, the method includes storing the configuration information. In certain embodiments, the method includes applying the configuration information in response to receiving a first request from the high layer client.

One apparatus for configuring protocol data unit sessions includes a device. In some embodiments, the apparatus includes a receiver that receives configuration information from a network. The configuration information includes: a first indication about whether to accept at least one high layer parameter requested by a high layer client of the device, wherein the at least one high layer parameter is applicable for protocol data unit session establishment or for updating stored user equipment route selection policy rules, or a combination thereof; and mapping information of the at least one high layer parameter of the first indication to at least one network parameter that is valid in the network. In various embodiments, the apparatus includes a processor that: stores the configuration information; and applies the configuration information in response to receiving a first request from the high layer client.

Another embodiment of a method for configuring protocol data unit sessions includes receiving a request from an application function including: an indication about whether to accept at least one high layer parameter requested by a high layer client of a device; an indication about whether the at least one high layer parameter requested by the high layer client is a one-time protocol data unit session establishment or an update to stored user equipment route selection policy rules; or a combination thereof. In some embodiments, the method includes determining whether to accept the request. In certain embodiments, the method includes, in response to determining to accept the request: determining configuration information for a user equipment; mapping information of the at least one high layer parameter to at least one network parameter that is valid in the network; or a combination thereof. In various embodiments, the method includes storing the configuration information to be provided to the user equipment. In some embodiments, the method includes transmitting the configuration information to the user equipment.

Another apparatus for configuring protocol data unit sessions includes a network function of a network. In some embodiments, the apparatus includes a receiver that receives a request from an application function comprising: an indication about whether to accept at least one high layer parameter requested by a high layer client of a device; an indication about whether the at least one high layer parameter requested by the high layer client is a one-time protocol data unit session establishment or an update to stored user equipment route selection policy rules; or a combination thereof. In various embodiments, the apparatus includes a processor that: determines whether to accept the request; in response to determining to accept the request: determines configuration information for a user equipment; maps information of the at least one high layer parameter to at least one network parameter that is valid in the network; or a combination thereof; and stores the configuration information to be provided to the user equipment. In certain embodiments, the apparatus includes a transmitter that transmits the configuration information to the user equipment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
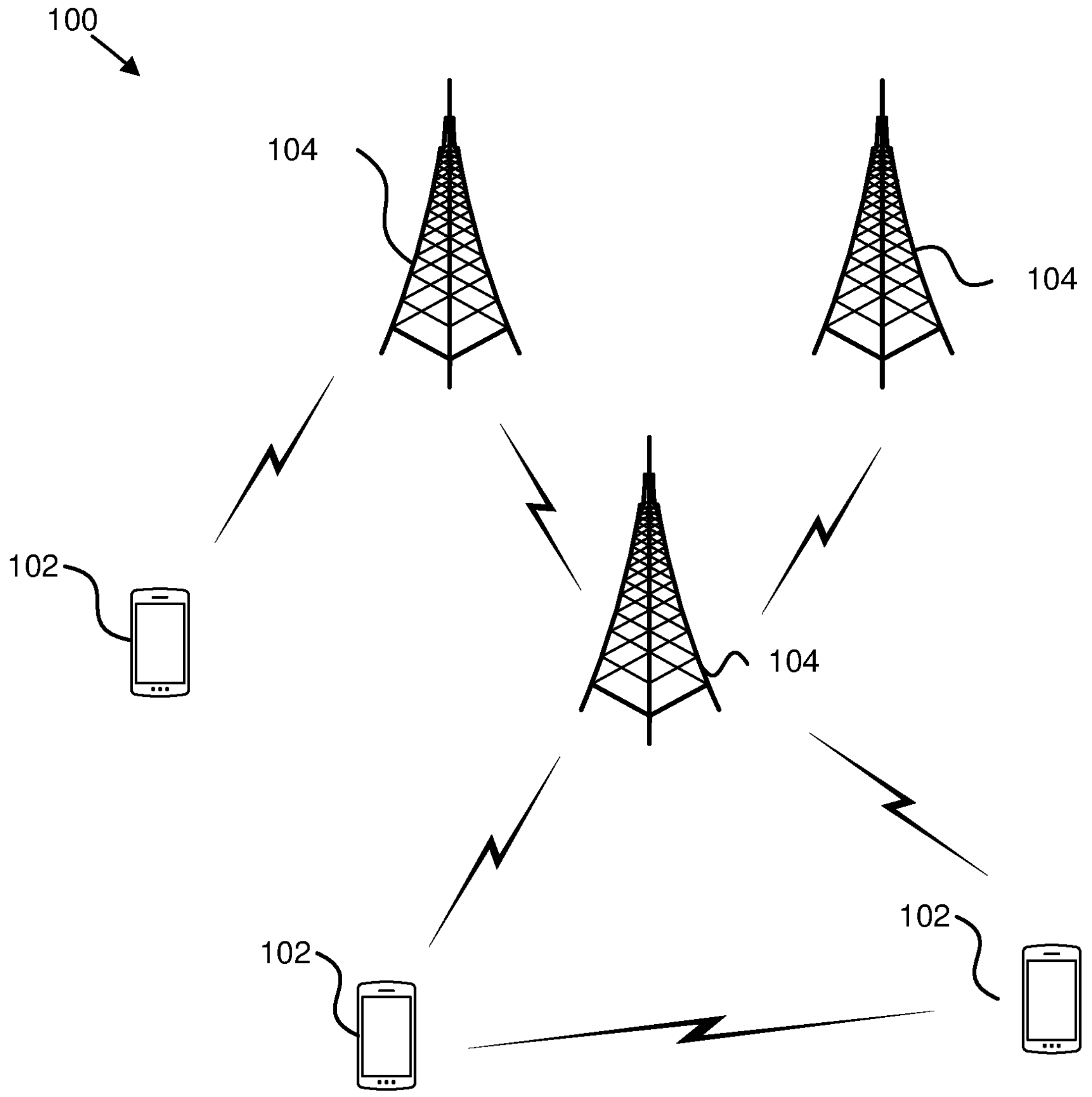
FIG. 1 is a schematic block diagram illustrating one embodiment of a wireless communication system for configuring protocol data unit sessions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring protocol data unit sessions. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive configuration information from a network. The configuration information includes: a first indication about whether to accept at least one high layer parameter requested by a high layer client of the device, wherein the at least one high layer parameter is applicable for protocol data unit session establishment or for updating stored user equipment route selection policy rules, or a combination thereof; and mapping information of the at least one high layer parameter of the first indication to at least one network parameter that is valid in the network. In some embodiments, the remote unit 102 may store the configuration information. In certain embodiments, the remote unit 102 may apply the configuration information in response to receiving a first request from the high layer client. Accordingly, the remote unit 102 may be used for configuring protocol data unit sessions.

In certain embodiments, a network unit 104 may receive a request from an application function including: an indication about whether to accept at least one high layer parameter requested by a high layer client of a device; an indication about whether the at least one high layer parameter requested by the high layer client is a one-time protocol data unit session establishment or an update to stored user equipment route selection policy rules; or a combination thereof. In some embodiments, the network unit 104 may determine whether to accept the request. In certain embodiments, the network unit 104 may, in response to determining to accept the request: determine configuration information for a user equipment; map information of the at least one high layer parameter to at least one network parameter that is valid in the network; or a combination thereof. In various embodiments, the network unit 104 may store the configuration information to be provided to the user equipment. In some embodiments, the network unit 104 may transmit the configuration information to the user equipment. Accordingly, the network unit 104 may be used for configuring protocol data unit sessions.

Figure 2:
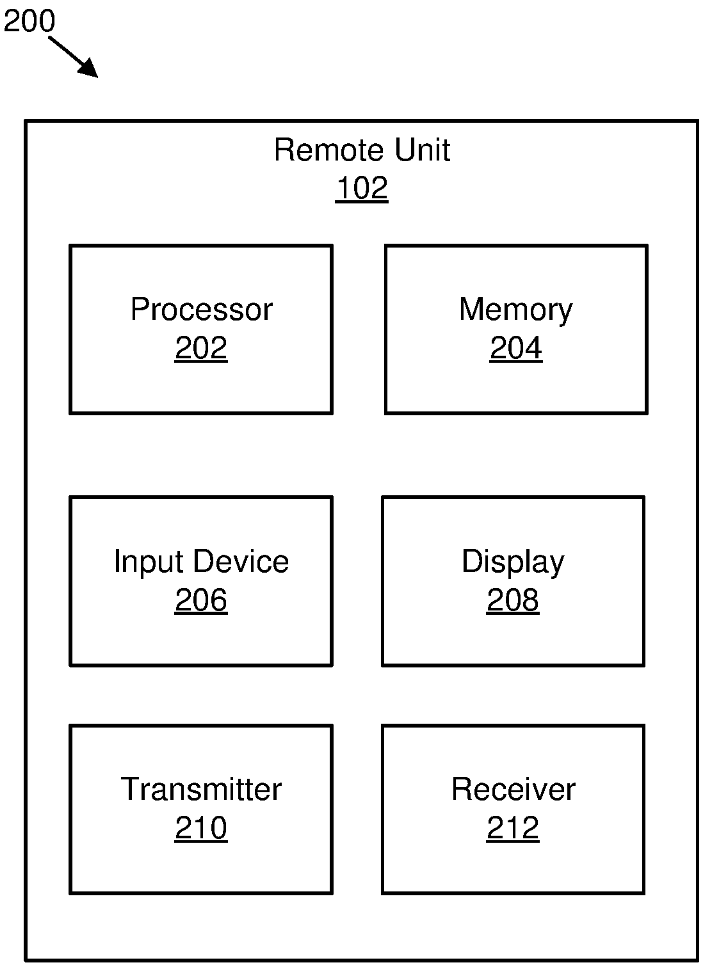
FIG. 2 is a schematic block diagram illustrating one embodiment of an apparatus that may be used for configuring protocol data unit sessions.

FIG. 2 depicts one embodiment of an apparatus 200 that may be used for configuring protocol data unit sessions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives configuration information from a network. The configuration information includes: a first indication about whether to accept at least one high layer parameter requested by a high layer client of the device, wherein the at least one high layer parameter is applicable for protocol data unit session establishment or for updating stored user equipment route selection policy rules, or a combination thereof; and mapping information of the at least one high layer parameter of the first indication to at least one network parameter that is valid in the network. In various embodiments, the processor 202: stores the configuration information; and applies the configuration information in response to receiving a first request from the high layer client.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
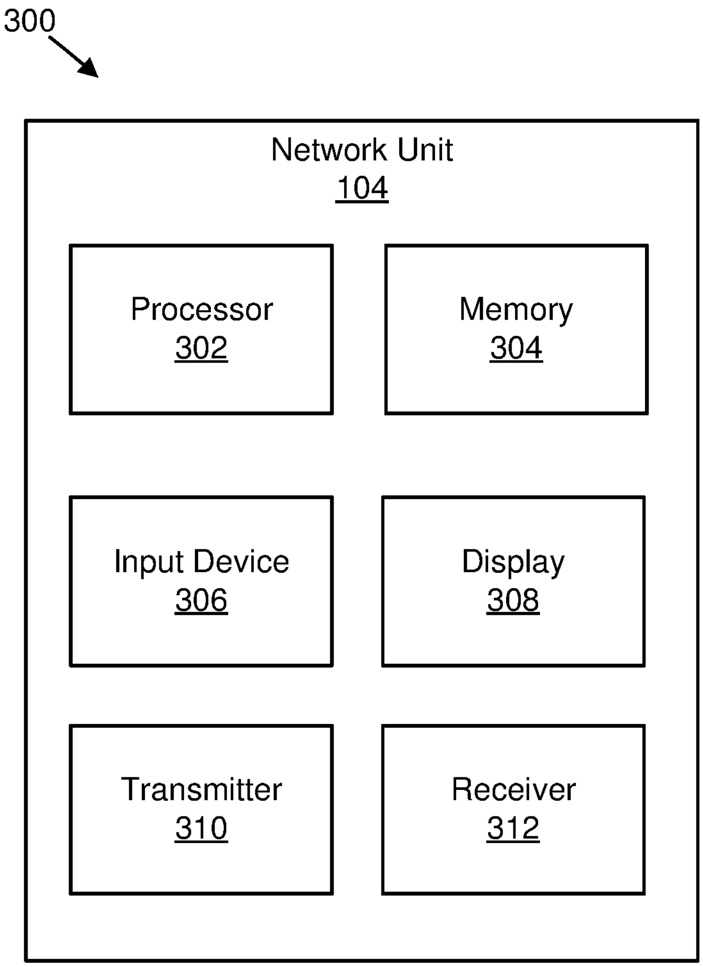
FIG. 3 is a schematic block diagram illustrating one embodiment of an apparatus that may be used for configuring protocol data unit sessions.

FIG. 3 depicts one embodiment of an apparatus 300 that may be used for configuring protocol data unit sessions. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives configuration information from a network. The configuration information includes: a first indication about whether to accept at least one high layer parameter requested by a high layer client of the device, wherein the at least one high layer parameter is applicable for protocol data unit session establishment or for updating stored user equipment route selection policy rules, or a combination thereof; and mapping information of the at least one high layer parameter of the first indication to at least one network parameter that is valid in the network. In various embodiments, the processor 302: stores the configuration information; and applies the configuration information in response to receiving a first request from the high layer client.

In some embodiments, the receiver 312 receives a request from an application function comprising: an indication about whether to accept at least one high layer parameter requested by a high layer client of a device; an indication about whether the at least one high layer parameter requested by the high layer client is a one-time protocol data unit session establishment or an update to stored user equipment route selection policy rules; or a combination thereof. In various embodiments, the processor 302: determines whether to accept the request; in response to determining to accept the request: determines configuration information for a user equipment; maps information of the at least one high layer parameter to at least one network parameter that is valid in the network; or a combination thereof; and stores the configuration information to be provided to the user equipment. In certain embodiments, the transmitter 310 transmits the configuration information to the user equipment.

In certain embodiments, application service continuity may be established for configurations in which one or more mobile devices are moving to a different service area where a used slice is not supported (e.g., due to lack of capabilities), the used slice is not available, or the used slice is not preferable (e.g., due to different exposure capabilities and access capabilities at a target area).

In some embodiments, network slicing is a key fifth generation ("5G") feature that uses logical end-to-end subnetworks corresponding to different verticals. Network slicing may enable deployment of multiple logical, self-contained networks, offering third parties and verticals customized services on top of a shared infrastructure. Based on a physical network that might be operated by a public operator or an enterprise, 5G may provide the means to run multiple slices for different communication purposes. Further, 5G may enable slices to run independently and/or isolated from each other.

In various embodiments, a network slice (e.g., private or public slice) may include a radio access network ("RAN") part and a core network ("CN") part. The support of network slicing may rely on a principle that traffic for different slices is handled by different protocol data unit ("PDU") sessions. In certain embodiments, a network may realize different network slices by scheduling and providing different layer 1 ("L1") and/or layer 2 ("L2") configurations. Each network slice may be uniquely identified by a single ("S") network slice selection assistance information ("NSSAI") ("S-NSSAI").

In some embodiments, NSSAI may include one or a list of S-NSSAIs where a S-NSSAI may be a combination of: 1) a mandatory slice and service type ("SST") field that identifies the slice type and includes 8 bits (e.g., with a range of 0-255); and/or 2) an optional slice differentiator ("SD") field which differentiates among slices with the same SST field and includes 24 bits.

In various embodiments, an S-NSSAI may not be supported homogenously within a 5G network of a public land mobile network ("PLMN"). If a user equipment ("UE") moves around, intra radio access technology ("RAT") ("intra-RAT") handover may be triggered if a target access and mobility management function ("AMF") or gNB does not support an S-NSSAI associated with one of the UE's PDU sessions, the S-NSSAI may be rejected by the target AMF or gNB, which may interrupt the service continuity and cause bad user experience.

In certain embodiments, an association of UEs to network slices may be a core network (e.g., fifth generation core network ("5GC")) feature, and may be transparent to the application layer. An application provider (e.g., application service provider ("ASP")-slice tenant) may request the instantiation or modification of network slices that may serve the ASP traffic by interaction with an operations, administration, and maintenance ("OAM") system of the network (e.g., slice management system) via management exposure.

In some embodiments, an application may have preference on certain slices. This may occur if applications (e.g., gaming or online video applications) access a 5GS over multiple slices for different services (e.g., based on a user membership), or have different priorities on different slices based on an application service provider ("ASP") request. Different slices may be available in all provided frequencies or a sub-set of them (e.g., frequency range 1 ("FR1") or frequency range 2 ("FR2")) based on a mobile network operator ("MNO") and ASP agreement (and network capabilities to support a slice requirement). Different ASPs may use these slices (or a subset of them) for different services that they offer. If an application changes the network slices to be accessed, it may be agnostic to the UEs accessing the service and may be performed automatically. In such embodiments, a slice enablement layer may allow application to slice remapping based on a slice customer and/or ASP needs.

In various embodiments, a UE may be configured with UE route selection policy ("URSP") rules that control how an application may be mapped to a network slice (e.g., identified by a single ("S") network slice selection assistance information ("NSSAI") ("S-NSSAI")) and data network name ("DNN"). One example for URSP rules is shown in Table 1. The URSP rules may include at least a traffic descriptor ("TD") and corresponding route selection descriptor ("RSD") with respect to which network slice to use.

TABLE 1

Example of URSP rules

| URSP rule | TD (e.g., App identifier ("ID"), fully qualified domain name ("FQDN"), internet protocol ("IP") descriptor, connection capabilities, etc.) | RSD (e.g., including parameters S-NSSAI, DNN, session and service continuity ("SSC"), protocol data unit ("PDU") type, etc.) |
|---|---|---|
| Rule#1 | Match-all | S-NSSAI 1 (Means that Applications without a matching rule are mapped to rule#1) |
| Rule#2 | App1 | S-NSSAI 4, S-NSSAI 1 |
| Rule#3 | App2 | S-NSSAI 2, S-NSSAI 4, S-NSSAI 1 |
| Rule#4 | App3 | S-NSSAI 2, S-NSSAI 3 |
| Rule#5 | App5, App6, App7 | S-NSSAI 4 |

In certain embodiments, some or all of the applications using a network slice (e.g., S-NSSAI #2) may use one or more alternative network slices. As used herein, an "alternative network slice" may be used to denote other slices which an application may be able to use. If the example of the URSP rules from Table 1 is considered, the App2, which may use S-NSSAI 2, may also use S-NSSAI 4 and S-NSSAI 1, if S-NSSAI 2 is not available (e.g., in other cells or network areas). In this example, S-NSSAI 4 and S-NSSAI 1 are considered as alternative network slices for the App2.

Figure 4:
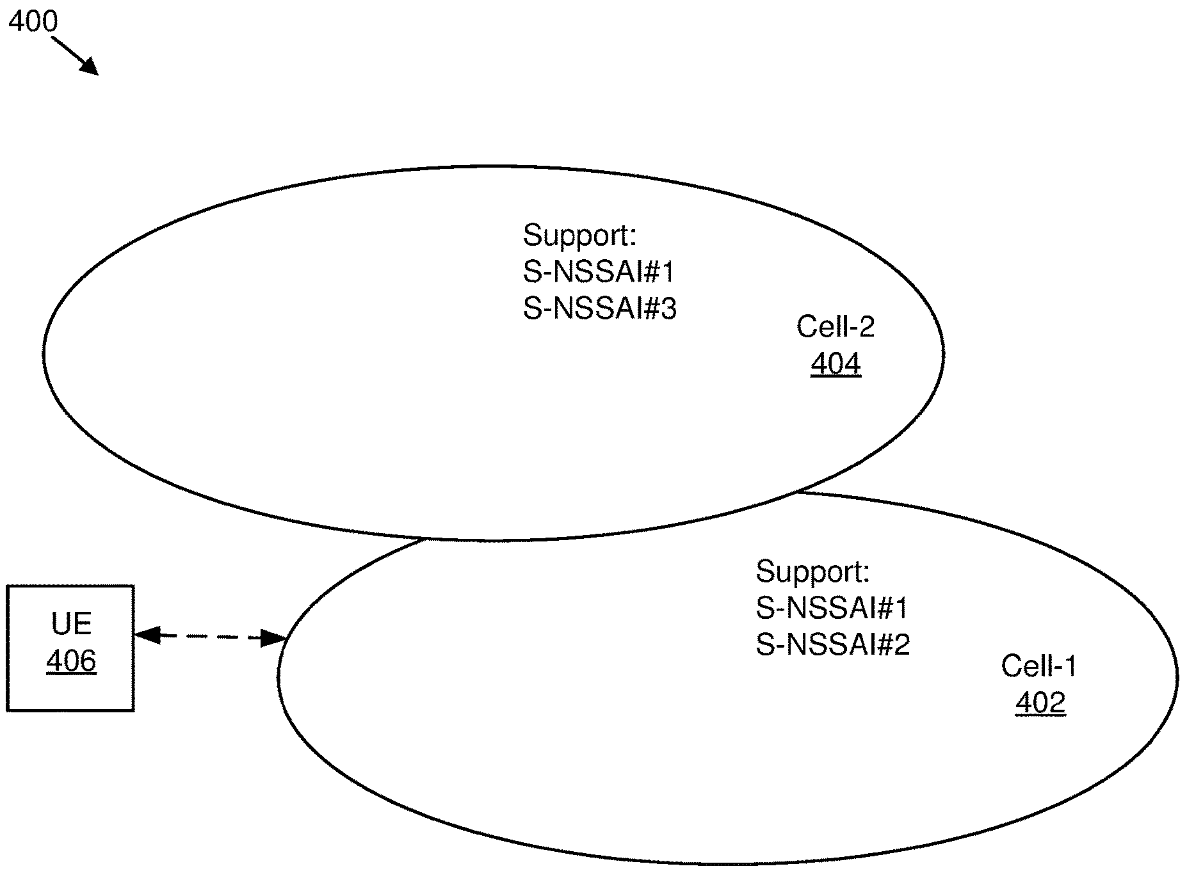
FIG. 4 is a schematic block diagram illustrating one embodiment of a system having a target area and/or cell not supporting all currently used network slices in a source cell.

FIG. 4 is a schematic block diagram illustrating one embodiment of a system 400 having a target area and/or cell not supporting all currently used network slices in a source cell. The system 400 includes a first cell 402 (Cell-1), a second cell 404 (Cell-2), and a UE 406 that communicates with the cells. The first cell 402 may support S-NSSAI #1 and S-NSSAI #2, and the second cell 404 may support S-NSSAI #1 and S-NSSAI #3.

In certain embodiments, as shown in Table 1, an application sends a request for connection establishment (e.g., protocol data unit ("PDU") session establishment request) and the request is evaluated to match to TDs stored in the URSP rules. The application request may include an operating system application identifier ("ID") ("OSApp ID"), FQDN, IP tuple, connection capabilities, or other information. Once a TD matches an application request (e.g., Rule #3 applies), the UE may use the corresponding RSD to establish the PDU session. If the allowed NSSAI includes any of the network slices S-NSSAI 2, S-NSSAI 4, S-NSSAI 1, then a PDU session is established by taking the higher-ordered network slice (e.g., S-NSSAI 2). If none of the S-NSSAI 2, S-NSSAI 4, S-NSSAI 1 are in the allowed NSSAI, then the UE cannot establish a PDU session. The URSP rules may be created in a policy control function ("PCF") responsible for access and mobility policies ("AM-PCF"). To change the priority order of network slices (e.g., to change the order of S-NSSAI 2, S-NSSAI 4, S-NSSAI 1) the AM-PCF may create a new URSP rule and send it to the UE (e.g., re-configure the UE). This may require that the AM-PCF should be triggered to create the new URSP rule.

In some embodiments, a network slice unavailability may impact a service continuity and result in packet losses or the inability of an application to communicate. In such embodiments, the application may use a different network slice (e.g., with the same or lower quality of service ("QoS")).

In various embodiments, from a core network ("CN") perspective, moving to a different registration area ("RA") may mean a change of CN functions (e.g., AMF, session management function ("SMF")) associated with the new RA. On the other hand, intra-RA mobility may not necessarily impact the CN functions; however, the UE may need to be subscribed and/or registered for the target slice to perform reselection.

In certain embodiments, if the UE's application is allowed to use a new network slice, this may be done via: 1) updating the application to S-NSSAI mapping in the URSP rules generated in the 5GC and send this to the UE; or 2) updating the application to S-NSSAI mapping in the UE's local policies.

In some embodiments, the URSP rules take precedence over the UE's local policies.

In various embodiments, an application is allowed to use a target slice (e.g., subscribed and/or registered with the target slice) and a performance may be kept intact for the UEs which will be affected by a slice change.

In certain embodiments, a network (e.g., 5GC) may control (e.g., enable or disable) an application layer to request a specific network slice or data network name ("DNN") when establishing a connection. Further, an application layer may request a specific network slice to be used for one-time PDU session establishment and/or to change an ordered priority (or preference) in a UE policy (e.g., URSP rules).

In some embodiments, packet loss may be avoided if an application is required to change from slice #1 to slice #2 due to: 1) a mobility to target cell and/or area which does not support currently used slices in a source cell; or 2) a change of slice preference.

Figure 5:
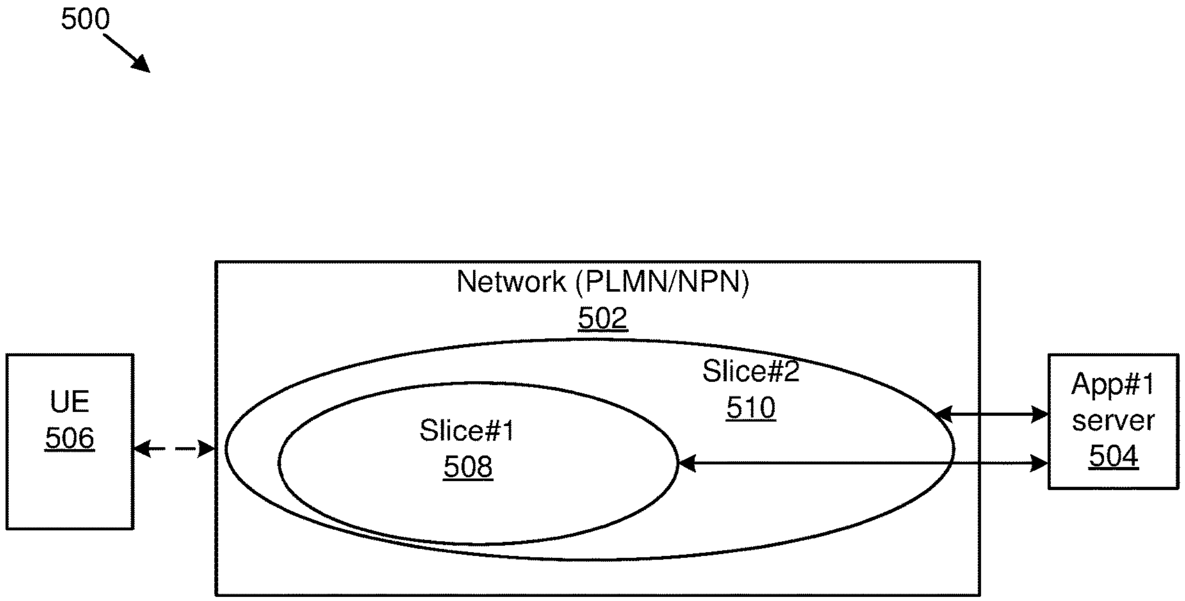
FIG. 5 is a schematic block diagram illustrating one embodiment of a system for slice usage by a UE.

FIG. 5 is a schematic block diagram illustrating one embodiment of a system 500 for slice usage by a UE. The system 500 includes a network 502 (e.g., PLMN and/or non-public network ("NPN")), an App #1 server 504, and a UE 506. The network 502 has a first slice (slice #1) 508 and a second slice (slice #2) 510. The App #1 is installed on the UE 506 and communicates with the App #1 server 504 over slice #1 or slice #2. Specifically, the UE 506 is subscribed and can use at least two network slices (e.g., slice #1 and slice #2). The App #1 server 504 may use any of slice #1 and slice #2 to exchange traffic with the application in the UE 506. The UE 506 may be configured with a URSP rule where the App #1 maps to a TD that has a corresponding RSD containing a list of slice #1 or slice #2, whereas the slice #1 and slice #2 are stored in priority order (e.g., slice #1 may have higher priority to be used than slice #2).

Figure 6:
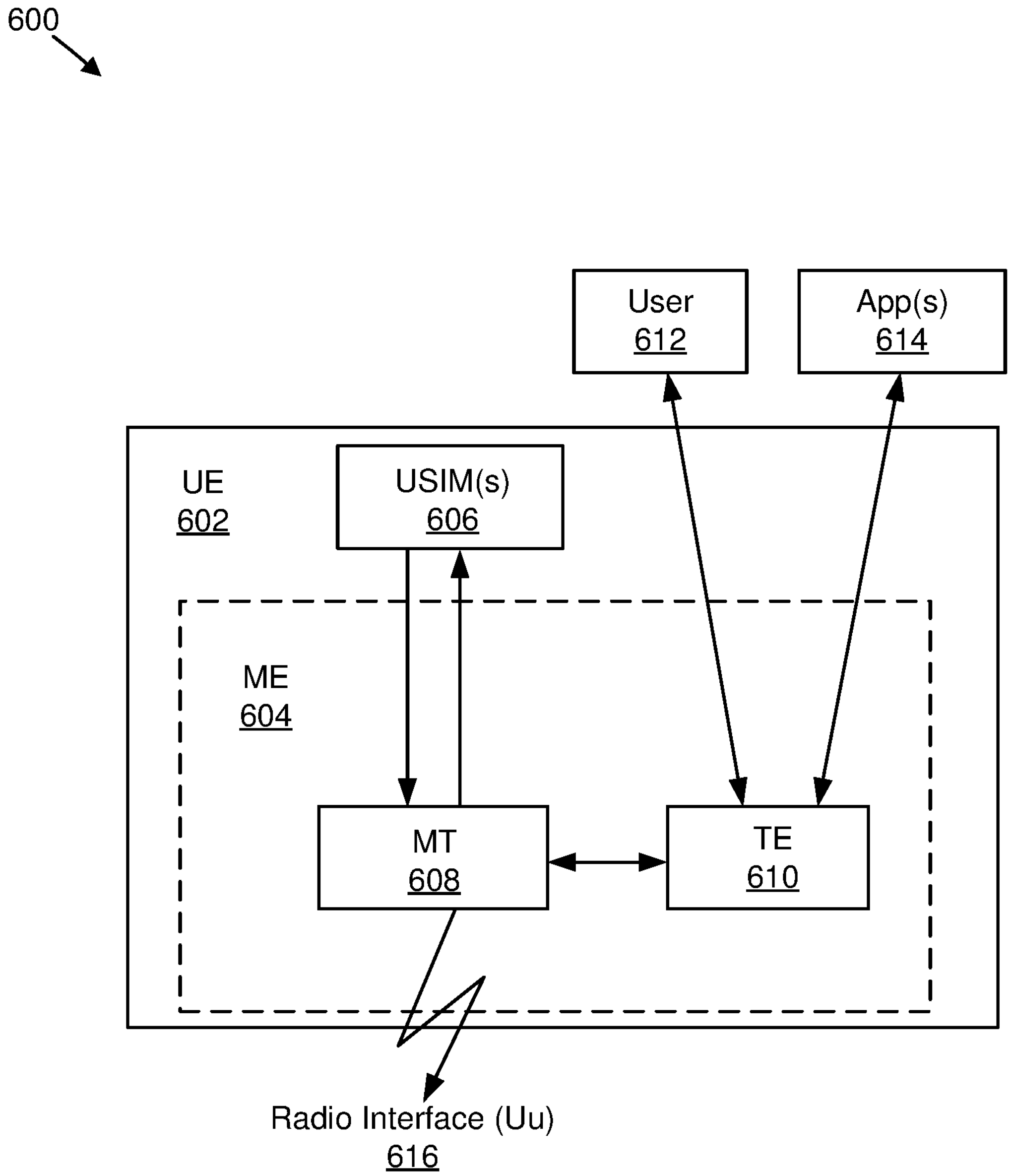
FIG. 6 is a schematic block diagram illustrating one embodiment of a system for communications by a UE.

FIG. 6 is a schematic block diagram illustrating one embodiment of a system for communications by a UE 602. The UE 602 may include: a mobile equipment ("ME") 604 (e.g., transceiver or modem), one or more universal subscriber identity module ("USIM") modules 606, and software applications or user interfaces. The ME 604 includes one or more mobile terminations ("MT") 608 specific to management of a PLMN access interface (e.g., 3GPP or non-3GPP), and one or more terminal equipment ("TE") 610 functions necessary for the operation of the access protocols by a "user" 612 or one or many applications (e.g., Apps) 614. The MT 608 may communicate over a radio interface ("Uu") 616.

Figure 7:
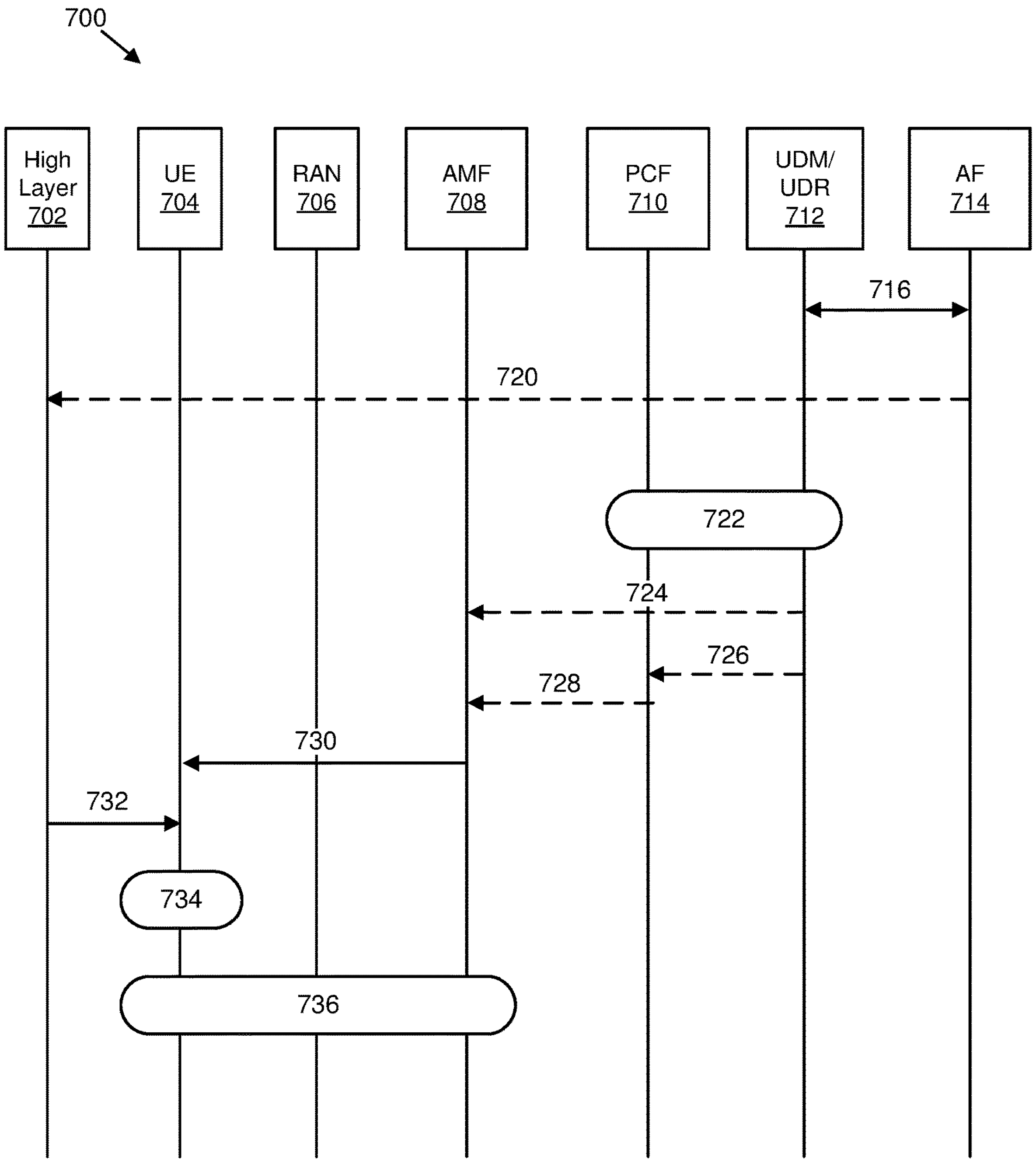
FIG. 7 is a schematic block diagram illustrating one embodiment of a system for configuring protocol data unit sessions.
Figure 8:
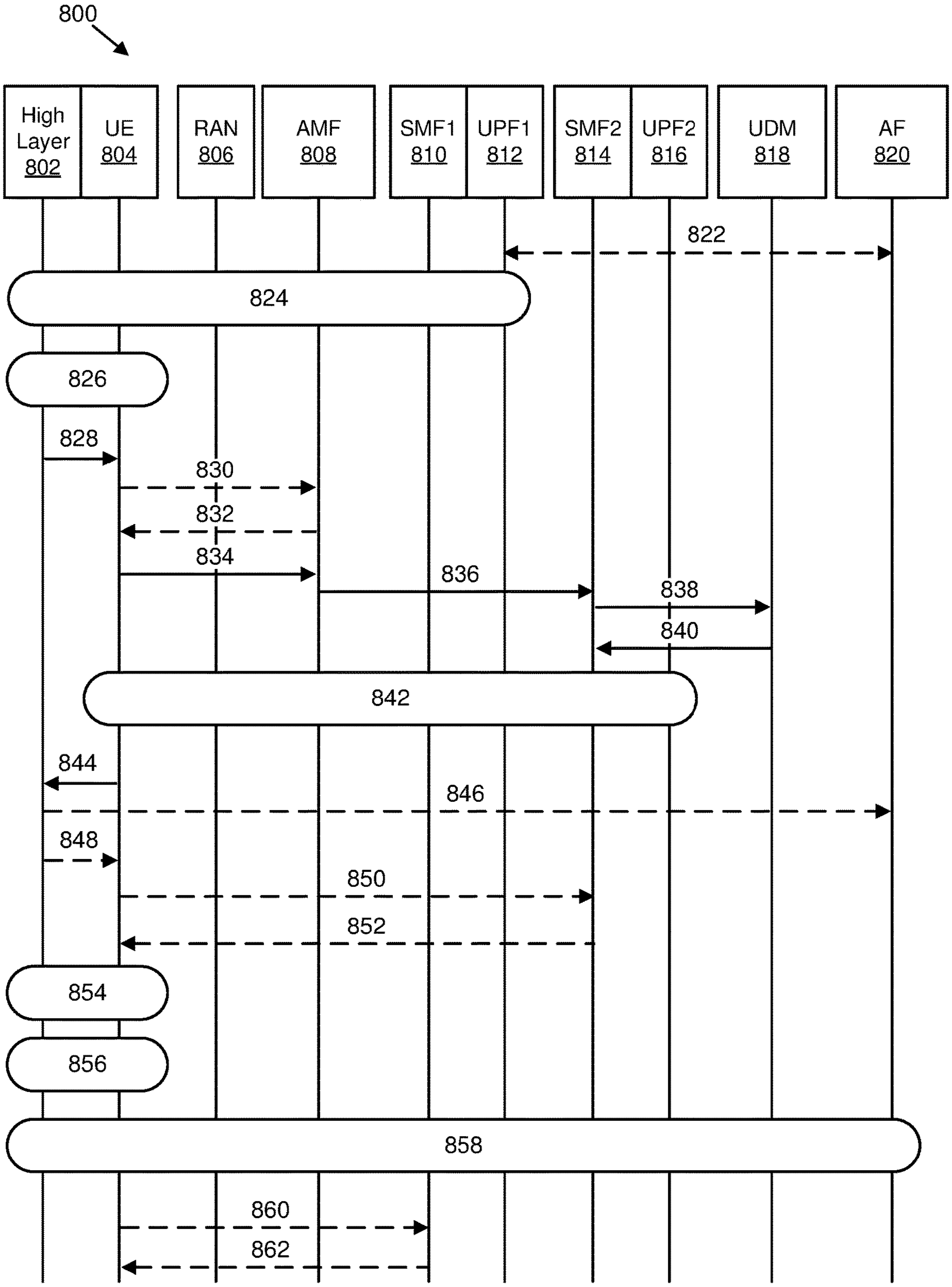
FIG. 8 is a schematic block diagram illustrating another embodiment of a system for configuring protocol data unit sessions.
Figure 9:
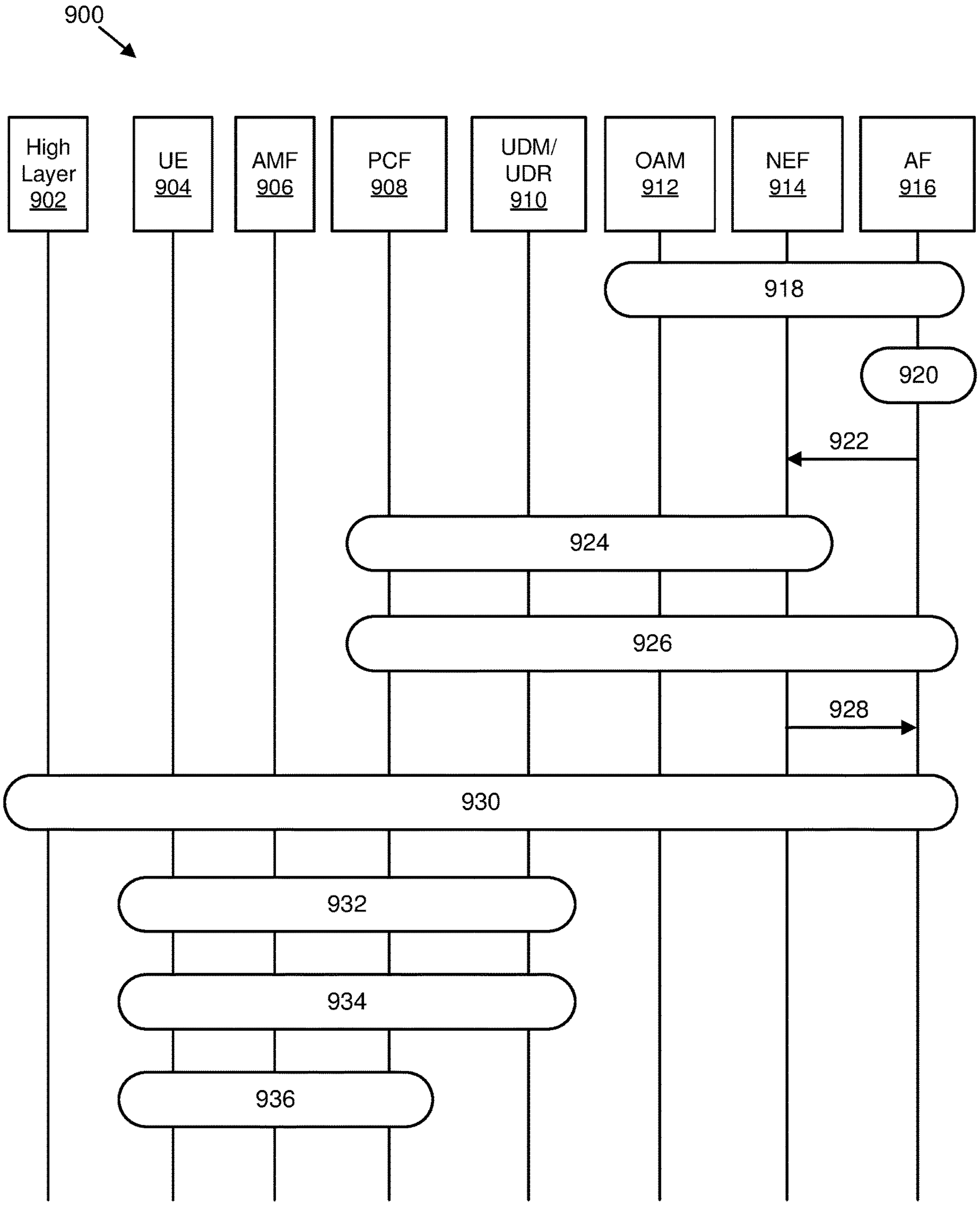
FIG. 9 is a schematic block diagram illustrating a further embodiment of a system for configuring protocol data unit sessions.

In one example, a high layer ("HL") client as used in FIGS. 7, 8, and 9 may be implemented as a combination of a TE, a "User", and/or "App(s)". In another example, the HL client may be implemented as a combination of "User" and/or "App(s)".

In certain embodiments, a UE may be configured by a 5GC by a URSP rule to use one or more network slices in priority order for an application request to establish a connection. The URSP rule may be only updated from a core network ("CN") (e.g., 5GC). The UE may be enabled to locally update or overwrite one or more URSP rules.

In some embodiments, a high-layer client (e.g., application layer, service enablement layer (NSCM client) or user preference inserted via man-machine interface ("MMI")) may be able to provide information indicating (a) which network slice or DNN to use when requesting establishment of a connection and (b) the purpose of the network slice (e.g., whether used for one-time connection establishment only and/or to update the URSP rules). If there is a stored URSP rule (e.g., including RSD) for a service and/or an application, further RSD parameters (e.g., SSC mode, PDU session type, etc.) may be used, but the S-NSSAI or DNN in the RSD may be exchanged with the slice ID (e.g., ENSI or S-NSSAI) or DNN requested by the application layer. In other words, based on a configuration parameter in the UE about whether HL indication is enabled to be used, the UE may use the HL indicated parameter in the PDU session establishment request message although there are valid parameters in the URSP rule.

In various embodiments, a network slice ID provided by a high-layer may be the same or different as a network slice ID stored in an URSP rule (e.g., S-NSSAI). If the network slice ID is different, then mapping information may need to be also configured to map to translate to an S-NSSAI.

In certain embodiments, an indication and/or information from higher-layers about a desired network slice may take precedence over network configuration (e.g., URSP rules). The 5GS may provide a configuration indication to the UE to indicate whether preference from the higher-layers should be taken into account or overwriting the network configuration. The UE may request a deactivation of a PDU session if the PDU session is currently not used by the application.

FIG. 7 is a schematic block diagram illustrating one embodiment of a system 700 for configuring protocol data unit sessions. The system 700 includes a high layer 702 (e.g., HL, high layer client, application, NSCM client), a UE 704, a RAN 706, an AMF 708, a PCF 710, a UDM/UDR 712, and an AF 714 (e.g., NSCM server, ASL). It should be noted that each of the communications of the system 700 may include one or more messages.

The AF 714 may be any of an NSCM server, any type of SEAL server, an application server, application service provider ("ASP"), an edge application server ("EAS") or a vertical application ("VAL") server. In a first communication 716, the AF 714 may agree with the network to use more than one network slices from the network (e.g., 5GS). For example, as shown in FIG. 5, the AF 714 may use slice #1 and slice #2 (e.g., for different types of traffic) for different types of UEs or during different time spans. Please note that the network slices slice #1 and slice #2 may be identified (1) within the network domain by S-NSSAI-1 and S-NSSAI-2 and (2) outside the network domain either by S-NSSAI-1 and S-NSSAI-2 or by external slice identifiers like ENSI-1 and ENSI-2.

30 The AF 714 may dynamically setup a preference about the applications in the UE 704 should use slice #1 or slice #2 (or alternatively DNN #1 or DNN #2) (e.g., the determination of which network slice (or data network name) to be used may not be based on URSP rules but may be based on an application request). In the first communication 716, the AF 714 may request that the 5GS enable the UE 704 to accept slice preference from the high layer (e.g., application layer, service layer client, or user preference).

The request from the AF 714 may be sent to a 5GC (e.g., UDM, UDR or PCF) directly or via an NEF exposed application programming interface ("API"). The AF 714 may provide in a request message to the 5GC at least one of following: (1) UE IDs (e.g., GPSI, SUPI, or hardware ID like international mobile equipment identity ("IMEI")) to which the request applies; (2) a service or application ID; and/or (3) relevant network slice IDs (e.g., S-NSSAI or ENSI) or DNN which may be in priority order.

In certain embodiments, a 5GC (e.g., UDM, PCF) may reply to the AF 714 with a response that includes at least one of the following parameters: 1) a result of a request (e.g., positive or negative)—this means whether the AF 714 is enabled to use application layer network slice preference during establishment of a connection in the UE 704—if the result is positive, the AF 714 may configure the UE 704 correspondingly—if the 5GC has replied positive, the 5GC may also configure the UE (e.g., non-access stratum ("NAS") layer or in the URSP rules) whether a request for a specific network slice from higher layer is enabled, e.g., as described in steps 724, 726, and 728; 2) high-layer ("HL") identification information (e.g., operating system ("OS") application ID, service ID, FQDN, target IP address and/or port, etc.) to be used by the high layer when sending a request for connection establishment—this HL identification information helps the UE 704 to select a valid TD of the URSP rule; and/or 3) mapping between network slice IDs (e.g., 20) external network slice information ("ENSI")) used by the high layer and S-NSSAIs used by the communication modem (e.g., ME part of UE) when requesting a connection establishment—this information may help the UE 704 to map the HL requested network slice ID (e.g., ENSI) to the S-NSSAIs stored in the URSP rule-if the DNN can be requested by the HL, the mapping information may include mapping between DNN (e.g., external data network name ("Ext-DNN")) used by the HL and DNNs used by the communication modem (e.g., ME part of UE) when requesting a connection establishment.

In an optional second communication 720, the AF 714 may send application layer configuration information to a corresponding client in the UE 704. The client in the UE 704 is denoted as a HL 702 client (e.g., HL because it is located above the NAS or AS layer) and may be an application client, network slice capability management ("NSCM") client, any type of SEAL client, or a service module. The HL can be represented by the TE 610 or User 612 from FIG. 6. The configuration information may include at least one of the parameters sent from the 5GS in step 716.

At any point, the AF 714 may send to the HL 702 client in the UE 704 new slice IDs or update network slice IDs to be used by the client. In certain embodiments, the mapping between network slice ID(s) (e.g., ENSI) and S-NSSAIs may be sent. The network slice IDs sent in this communication may be in priority and/or preference order. In addition, the AF 714 may send to the HL 702 DNNs in priority order to be used by the HL 702. The AF 714 may determine a preference based on various conditions.

In a third communication 722, the network (e.g., 5GS, more specifically, UDM/UDR 712 or PCF 710) may store at least one of: (1) a configuration about whether the HL 702 is enabled to set a slice preference; (2) a mapping of an application requested slice ID (e.g., ENSI) to an S-NSSAI valid in the network; and/or (3) a mapping of application requested DNN (e.g., Ext-DNN) to a DNN valid in the network.

The storing may be (1) in the corresponding UE's subscription data in UDM/UDR 712, (2) in the service and/or application subscription data in the UDR, or (3) in configuration data in the PCF 710.

In a fourth communication 724, a fifth communication 726, a sixth communication 728, and/or a seventh communication 730, there may be a UE registration procedure, a UE configuration procedure, and/or UE route selection policy ("URPS") rules update procedure. As described in step 722, the 5GC may store UE network slice configuration information for high layer preference (e.g., UE NSCI-HLP). The NSCI-HLP may contain the allowance to use HL network slice preferences or a mapping of an application requested slice ID to S-NSSAI valid in the network. During a NAS procedure (e.g., registration procedure or UE configuration update procedure) the 5GS may configure the UE 704 with NSCI-HLP, which may contain: 1) a HL client identifier (e.g., application ID, FQDN, etc.); 2) an indication and/or parameter about whether the HL 702 is enabled to set a slice preference; 3) an indication about whether the HL 702 is enabled to request a network slice for a one-time PDU session establishment or to change an ordered priority (or preference) in a UE policy (e.g., URSP rules)—for example, if the HL 702 request matches a TD part of the URSP rules and if the network slice priority update in URSP is enabled, the network slice IDs or DNNs received from the HL 702 may be used to update an RSD part of the URSP rules; 4) a mapping of an application requested slice ID (e.g., ENSI) to one or more S-NSSAIs valid in the network (e.g., S-NSSAI valid in the home network, home public land mobile network ("HPLMN")); and/or 5) a mapping of an application requested DNN (e.g., Ext-DNN) to a DNN valid in the network.

In one example ("Example A"), during a registration procedure, the AMF 708 may send new NSCI-HLP information (e.g., HL 702 is enabled to set a slice preference) to the UE 704 included in a registration accept message. For example, the AMF 708 may obtain the NSCI-HLP information (or a part of it such as the parameter that the HL 702 is enabled to set a slice preference) from the UDM 712 during the subscription data retrieval procedure.

In another example ("Example B"), during a UE configuration update procedure, the AMF 708 may send new NSCI-HLP information (or a part of it such as the parameter that the HL 702 is enabled to set a slice preference) in a configuration update command message. As in the registration procedure, the AMF 708 may learn this information from the UDM 712 during a notification that the subscription data has been updated.

In yet another example ("Example C"), the UDM 712 may use the UE parameter update ("UPU") procedure to configure the UE 704 with NSCI-HLP information.

In a further example ("Example D"), during an URSP rules update procedure triggered from the AM-PCF, the URSP rules (e.g., identified by TD) may contain NSCI-HLP information. For example, the RSD part of the URSP rules may contain the NSCI-HLP information.

In an eighth communication 732, the HL 702 client determines to request a connectivity service from the communication module in the UE 704 (the communication module may include a connectivity manager client in the UE 704 (e.g., implemented in the UE's operating system, and the ME part of the UE 704). The 702 HL client request for connection may include any existing parameter: application descriptors, IP descriptors, domain descriptors (e.g., FQDN), DNN, connection capabilities (e.g., "IMS", "MMS", "Internet"), etc. The HL 702 client may also request: 1) a network slice identifier (e.g., ENSI 2 or S-NSSAI 2)—the HL 702 client may use the network slice ID (e.g., ENSI or S-NSSAI) which is configure by the AF 714 as in step 720—the HL 702 client may use an S-NSSAI obtained from a lower layer (e.g., NAS or AS) used in the network (e.g., in case of mobility to a target cell supporting different set of slices than the source cell as shown in FIG. 4); and/or 2) a parameter indicating whether the network slice is used for one-time PDU session establishment or to change the ordered priority (or preference) in the UE policy (e.g., URSP rules).

Table 2 shows one example of how the HL 702 client can request a connection or a URSP update. In this example, the "Example D" herein is used. The parameters "target network slice(s)" and "URSP update indication" in the HL request message, as well as the parameters "HL SliceRequest Allowed" and "MappingInfo" in the RSD of the URSP rule are considered as new parameters. In certain embodiments, "target network slice(s)" and "URSP update indication" may be combined into a single vector parameter having multiple indications.

TABLE 2

| | | |
|---|---|---|
| HL client request for connection: | | |
| | application ID = "com.example.app1" | |
| | target DNN = DNN-B | |
| | target network slices = ENSI-2 | |
| | URSP (or RSD) update indication = yes / no | |
| URSP rule: | | |
| TD: | OSAppId = "app1.example.com" | |
| RSD: | Network Slice Selection = S-NSSAI-1 | |
| | DNN Selection =DNN-A | |
| | PDU type = IPv6 | |
| | HL SliceRequest Allowed = Yes/No | |
| | MappingInfo = [ENSI-2 = S-NSSAI-2, DNN-B = DNN-A] | |

In Table 1, information about (1) the indication that "HL is allowed to request a slice preference" (e.g., "HL SliceRequest Allowed" and (2) a mapping network slice IDs to S-NSSAIs used by the high layer towards the communication modem information (e.g., "MappingInfo") is stored as part of the RSD in the URSP rule. In addition, the HL 704 in the request for connection may contain an indication whether the parameter "target slice" should be (a) used just once for PDU session establishment or (b) used to overwrite the existing URSP rule (e.g., "[one-time, overwrite RSD]"). This may be an independent parameter or a part of the "target slice" parameter which may be a vector parameter having multiple sub-parameters.

In some embodiments, if the HL 702 includes an application enabler client at the device side (e.g., NSCM client), the HL connection request may be provided firstly by an application-specific client to the application enabler client, and secondly from an application enabler client to the connection management client of the UE 704. The network slice identifier may be either provided by the application specific client or the application enabler client or both; however, a different slice identification may be provided by the different type of clients (e.g., application client to provide slice #2 ID, where the NSCM client translates it to S-NSSAI #2 and sends this to the UE 704).

The UE 704 evaluates 734 whether the HL 702 request for connection matches any TD in the URSP rules (e.g., if there is a matching URSP rule). If there is a matching URSP rule and the connection request includes a slice ID (or DNN), the UE 704 determines whether the HL 702 is allowed to request a network slice and/or DNN preference (e.g., as configured). If the target slice and/or DNN preference by HL 702 is enabled, the UE 704 may apply at least one of the following: (1) either exchange the S-NSSAI stored in the RSD for the new PDU session establishment (e.g., but do not update the RSD of the existing URSP rule); or (2) overwrite the S-NSSAI stored in the RSD with the S-NSSAI from the HL connection request (e.g., S-NSSAI #2).

It should be noted that the RSD may contain multiple S-NSSAIs in priority order. If a slice ID and/or DNN is sent in the connection request and if the HL 702 is allowed to request a slice preference, the UE 704 considers the slice ID and/or DNN from the HL 702 connection request as the highest priority. In other words, the UE 704 uses the slice ID from the connection request (e.g., S-NSSAI #2) instead of the list of S-NSSAIs stored in the RSD. In some embodiments, the DNN from the RSD is overwritten by the DNN from the connection request.

In various embodiments, if the HL 702 receives "mapping network slice ID(s) to S-NSSAIs used by the high layer towards the communication modem" information, the HL 702 may use these S-NSSAIs, which are considered valid in the network. A "valid S-NSSAI" is an S-NSSAI valid in the home network (e.g., HPLMN) and may be part of either the configured NSSAI or from the S-NSSAI included in the URSP rules.

In certain embodiments, if the HL 702 has not received a "mapping network slice ID(s) to S-NSSAIs used by the high layer towards the communication modem" or "the S-NSSAI valid in the network" is no longer correct, the UE 704 (e.g., ME part of the UE 704) may use a "mapping of application requested slice ID to S-NSSAI valid in the network" as described herein. The UE 704 maps the slice ID from the HL 702 request for connection to a S-NSSAI valid in the network. This may also apply to DNN mapping information.

In some embodiments, if the UE 704 has already established a PDU session matching the TD of the URSP rule and the HL 702 request for a connection contains a "target slice" value different from the S-NSSAI stored in the RSD of the URSP rule, the UE 704 may decide to establish a new PDU session using the a "target slice" value from the HL 702 request for connection.

In a ninth communication 736, the UE 704 may perform a NAS registration request procedure if the UE 704 is not registered to the S-NSSAI #2. If the UE 704 is registered to the S-NSSAI #2 (e.g., the S-NSSAI #2 may be part of the allowed NSSAI), the UE 704 may create and send a NAS SM PDU session establishment request message to the network, which may include at least one parameter (e.g., PDU session ID, S-NSSAI #2, DNN-A, etc.).

It should be noted that one of the following may occur—the ENSI value or S-NSSAI value changes (e.g., not the mapping itself is changed), but the value changes. For example, a different ENSI value may be assigned by the AF 714 or the S-NSSAI value changes due to some changes in the network deployment. If this happens, the procedure in FIG. 7 may be repeated, where instead of exchanging a new parameter, a parameter update is exchanged.

In certain embodiments, a benefit of a solution in FIG. 7 may be that the 5GC may dynamically configure the UE 704 with NSCI-HLP. The NSCI-HLP contains information whether to accept a network slice and/or DNN preference information from high layers (e.g., if an application or service may be associated with one or more network slices). If the UE 704 is enabled to use the HL's network slice preference information, the UE 704 may also be configured to map the network slice ID from the HL 704 to S-NSSAIs used in the 5GS.

In a first embodiment, there may be details requested about UE centric procedures about HL network slice preferences.

FIG. 8 is a schematic block diagram illustrating another embodiment of a system 800 for configuring protocol data unit sessions (e.g., UE-initiated traffic mapping on a new network slice). The system 800 includes a high layer 802 (e.g., HL, high layer client, application, NSCM client), a UE 804, a RAN 806, an AMF 808, a first SMF 810 ("SMF1"), a first UPF 812 ("UPF1") (the SMF1 and UPF1 may both be part of a slice #1), a second SMF 814 ("SMF2"), a second UPF 816 ("UPF2") (the SMF2 and UPF2 may both be part of a slice #2), a UDM 818, and an AF 820 (e.g., NSCM server, application service provider ("ASP")). The AF 820 may be substantially similar to the AF 714 of FIG. 7. It should be noted that each of the communications of the system 800 may include one or more messages.

In a first communication 822 and/or a second communication 824, the AF 820 may agree to use more than one network slices from a network (e.g., slice #1 and slice #2). The UE 804 may use slice #1 for application traffic.

In a third communication 826, the UE 804 (or UE together with the HL 802 client) may determine a trigger event to change slice preferences for an application (e.g., App 1). The trigger event may include: (1) the UE 804 is at a service or slice #1 boarder area (e.g., due to slice unavailability); or (2) a change of network slice preference is requested from an application layer (e.g., requested from an AF 820). This determination may be at an application layer (e.g., HL 802), NAS layer, or AS layer.

In one example, if the determination is at the NAS layer, the NAS layer may subscribe with the AS to receive information about whether a PDU session continuity cannot be guaranteed due to UE mobility with a cell and/or area where the current used network slices are not supported. The NAS layer may determine (1) to initiate the establishment of a new alternative (e.g., backup) PDU session to a new network slice and/or (2) to indicate to the HL 802 client that the existing PDU session may be terminated due to unavailability in the target cell and/or area or other constraints.

In another example, if the determination is at the HL 802, the HL 802 may subscribe with the AS layer to receive information about (a) the current UE location or (b) whether a PDU session continuity cannot be guaranteed due to UE mobility with a cell and/or area where the current used network slices are not supported. The HL 802 may determine a trigger step by comparing a current UE location and a pre-configured location as described in FIG. 7. The HL 802 may also receive trigger signaling as described in relation to FIG. 7.

In some embodiments, in addition to determine a slice preference change, the UE 804 or HL 802 client may determine whether to request slice IDs either (a) for one-time PDU session establishment or (b) to change the ordered priority (or preference) in the UE policy (e.g., URSP rules).

In a fourth communication 828, the HL 802 sends a request for a connection. The request may contain at least one of the following parameters: 1) a preferred network slice ID (e.g., slice #2 ID, S-NSSAI-2)-if the slice #2 ID is an ENSI, the UE 804 is configured to map the ENSI to S-NSSAI—the mapping from ENSI to S-NSSAI may be configured as described in FIG. 7; 2) an indication about whether this is an additional connection—the indication of 'additional connection' may be processed in the UE 804 by using the same RSD parameters of the already established connection, but instead of the S-NSSAI from the RSD, the network slice ID (e.g., S-NSSAI-2) indicated by the HL 802 is used-in other words, the same TD of the URSP rule may apply (e.g., OSAppID, FQDN, etc.) but the S-NSSAI from the RSD may be exchanged with the S-NSSAI indicated by the HL 802—in addition, the indication of 'additional connection' may also mean that the URSP rules corresponding to the HL 802 request may not be updated-in other words, the request from HL 802 is handled as a one time request for the establishment of a PDU session; and/or 3) an indication about whether a corresponding URPS rule is to be updated. If the HL 802 intends to modify (e.g., update) the URSP rules corresponding to the App 1, the HL 802 should include this indication, so that the UE 804 may internally update the URSP rule (e.g., the RSD part of the matching URSP rule). For example, the S-NSSAI sent from the HL 802 may overwrite the S-NSSAI stored in the RSD of the matching URSP rule.

In an optional fifth communication 830 and/or an optional sixth communication 832, if the UE 804 is not registered with S-NSSAI #2, the UE 804 initiates a NAS registration procedure to request a registration to S-NSSAI #2.

In a seventh communication 834 and/or an eighth communication 836, the UE 804 initiates the establishment of a PDU session according to the request in step 828.

If the S-NSSAI #2 is a part of the allowed NSSAI, the UE 804 may evaluate whether there are existing established PDU sessions which may be used for the request from step 828. For example, the RSD part of the URSP rule mapping to the request from step 828 matches an already existing PDU session. In such case, the UE 804 may initiate a PDU session modification procedure if needed.

In various embodiments, the UE 804 may initiate a PDU session establishment procedure towards the S-NSSAI #2. The request from the UE 804 may include at least the following parameters: PDU session ID, S-NSSAI #2, DNN, and/or a new parameter that indicates whether the PDU session is in an inactive (or dormant) mode. The indication for the inactive (or dormant) mode connection may mean that user plane ("UP") resources may not be established if the default quality of service ("QoS") flow includes a guaranteed bit rate ("GBR") QoS flow (e.g., this is to avoid the use of radio resources over the Uu interface although there may be no data packets yet, as a first connection is still in use). If the default QoS flow is associated with a non GBR ("Non-GBR") QoS flow, then the PDU session establishment may be completed, as no radio resources would be.

In a ninth communication 838 and/or a tenth communication 840, the SMF2 814 requests the UE session management subscription data (e.g., by using the service operation Nudm_SDM_Get).

In an eleventh communication 842, the SMF2 814 completes the PDU session establishment. If the default QoS flow is of type Non-GBR, the procedure is completed by the configuration and/or reconfiguration of radio resources (e.g., establishment of a new non-GBR data radio bearer ("DRB") or reconfiguration of existing DRB).

In a twelfth communication 844, the NAS layer may indicate to the HL 802 that a second connection is available.

In an optional thirteenth communication 846, the HL 802 may use application level signaling to inform the corresponding AF 820 that the second connection is available. In addition, the signaling may include an IP address second connection (e.g., from the PDU session).

In an optional fourteenth communication 848, the HL 802 may indicate to the NAS layer that the UP resources of the first connection may be deactivated. This may be to save radio resources (e.g., Uu resources) and to release an N3 tunnel.

In an optional fifteenth communication 850 and/or an optional sixteenth communication 852, the UE 804 (e.g., NAS SM layer) may initiate NAS SM signaling to the SMF2 814 (e.g., over N1 interface) to request the deactivation of UP resources for the first connection.

In a seventeenth communication 854, the UE 804 and/or HL 804 client may determine a trigger event for switching from the first connection (e.g., which has active UP resources, i.e., transmitting data) to the second connection (e.g., which has inactive UP resources, i.e., not transmitting data). The trigger event may be determined by at least one of the following: 1) the first connection is unavailable; or 2) the priority of slice #2 is increased and becomes higher than the priority of slice #1.

In an eighteenth communication 856, the UE 804 triggers a switch of the traffic from the first connection to the second connection. In other words, the HL 804 starts using the second connection to transmit data. If the UP resources of the second connection are deactivated, the UE 804 initiates UP resource activation (e.g., sending an NAS service request message including the PDU session ID 2 in the list of PDU sessions to be activated.

In a nineteenth communication 858, the HL 802 in the UE 804 may start using the second connection and the data transmission flows may be transmitted over the second connection. It should be noted that the HL 802 client may select which connection to use, if there are multiple connections requested and established by the HL 802 client.

For UE mobility outside of the coverage area for slice #1, the UE 804 may use the second connection as provisionally established (e.g., as "ready-for-use" whenever the first connection is no longer available). For example, a lower layer (e.g., AS or NAS layer) may indicate to the HL 802 client that the first connection is to be released (e.g., during a handover procedure to a cell and/or area where the slice #1 is no supported). For example, this may happen if the DRBs associated with the first connection cannot be transferred to the target cell and/or area. It may be preferable if the indication from the lower layer is provided to the HL 802 client in advance before the first connection becomes unavailable, so that the HL 802 client may activate the second connection to avoid packet losses. Then the HL 802 client may decide to start using the second connection. In this way, the impact to the application traffic (and thus the impact to the QoE) is minimized although the UE 802 switched from using of slice #1 to using slice #2.

In an optional twentieth communication 860 and/or an optional twenty-first communication 862, if the activation of the second connection is due to higher slice #2 preference, then the UE 804 may want to save UP resource usage by performing either (1) a NAS PDU session modification procedure to request the deactivation of the UP resources for the first connection, or (2) a NAS PDU session release procedure to release the PDU session corresponding to the first connection.

It should be noted that a benefit of the embodiment of FIG. 8 may be that the UE 804 using App1 may be able to establish a PDU session for the second connection simultaneously (e.g., in parallel) while using a PDU session for the first connection, where both the first connection and the second connection are associated with the same App 1, but different network slices (e.g., slice #1 and slice #2) are used over the mobile network. The impact to the application traffic (and thus the impact to the QoE) during handover to a cell and/or are where the slice #1 is no longer available is minimized, since a switch from slice #1 to slice #2 happens smoothly.

In a second embodiment, there may be a network centric allowance of HL requested network slice preferences. In the second embodiment, it may be assumed that the "network slice update" or the "network slice preference update" is a service provided by the network (e.g., 5GC) toward the application server (e.g., AF). The network may negotiate with the AF to use the network slice update service. Furthermore, once the network (e.g., 5GC) has agreed to activate the "network slice update" service, the 5GC needs to configure the UE correspondingly.

In one example, by default the UE may ignore requests for a connection from a HL client to use a particular network slice. Therefore, the UE may need to be configured to accept such requests from the HL client. The network (e.g., 5GC) may configure the UE to start or stop accepting the requests for network slice preference from a (specific) HL client. The HL client may be identified by a HL client ID which may be an application ID, or any other parameter used in the traffic descriptor part of the URSP rules.

FIG. 9 is a schematic block diagram illustrating a further embodiment of a system 900 for configuring protocol data unit sessions (e.g., slice policy update from an AF towards a UE). The system 900 includes a high layer 902 (e.g., HL, high layer client, application, NSCM client), a UE 904, an AMF 906, a PCF 908, a UDM/UDR 910, an OAM 912 (e.g., operational support system ("OSS"), business support system ("BSS")), a network exposure function ("NEF") 914, and an AF 916 (e.g., NSCM server, ASL). The application function ("AF") 916 may be substantially similar to the AF 714 of FIG. 7. It should be noted that each of the communications of the system 900 may include one or more messages.

In certain embodiments, the AF 916 may agree with the network (e.g., fifth generation system ("5GS")) to use more than one network slices. The AF 916 may serve one or more applications (or application servers) (e.g., App 1, App2, etc.). In a first communication 918, the AF 916 establishes a service level agreement with the network operator to use a service to dynamically update slice preferences (e.g., which slice (out of the agreed multiple slices) is to be used by a specific application (e.g., App 1) or to be changed based on AF events).

It should be noted that the UE 904 may initiate a change to use different network slices, but before the UE 904 is configured to do so, the AF 916 and the network may need to negotiate the capabilities and the authorization and/or activation to use the feature. For example, the AF 916, which may be a network's customer, may be changed if the service is activated.

During a negotiation, the AF 916 and network may agree to use (1) a specific application ID (e.g., App ID) to identify a service provider, customer, and/or AF 916 and (2) a network slice ID (e.g., ENSI or S-NSSAI) per network slice to identify each negotiated and/or agreed network slice deployed in the network. This negotiation may happen between the AF 916 and (a) the OAM 912 system, (b) the network's OSS/BSS system, (3) the UDM/UDR 910, or a combination thereof.

The AF 916 may use 920 an initial setup based on how the network slices negotiated in step 918 are used. For example, App 1 may be configured to use in priority order [slice #1, slice #2]. At any time, the AF 916 may determine a trigger point to change the priority of the slice. A trigger event may include: 1) a UE location is at a border of a service area or slice #1 area-such event may result in a decision that the UE may establish an additional connection (e.g., PDU session) to slice #2; and/or 2) that the network slice preference for an App 1 needs to be changed-such event may result in a decision that the slice preference for App 1 changes to [slice #2, slice #1].

In a second communication 922, the AF 916 sends a request to the network (e.g., 5GC) including at least one of the following parameters: (1) an application and/or service ID identifying the application and/or service authorized and/or agreed with the network; (2) a request to allow an application client (e.g., HL 902 client) in the UE 904 to request a specific slice preference; and/or (3) an external slice ID (e.g., ENSI) or external DNN (e.g., Ext-DNN) which may be requested by the HL 902 in the UE 904.

In certain embodiments, the NEF 914 checks whether the AF 916 is authorized to perform this request and the NEF 914 (e.g., packet flow description ("PFD") function ("PFDF")) checks if the AF 916 is authorized to provide this PFD data based on operator policies.

In some embodiments, the AF 916 may use one of the existing services exposed by the NEF 914 with corresponding enhancements. For example, the Nnef_AMPolicy Authorization, Nnef ServiceParameter or Nnef_ApplyPolicy may be enhanced to include an exchange of information as described in relation to FIG. 7.

In various embodiments, the AF 916 may use a new service exposed by the NEF 914. For example, the service may be called Nnef_SlicePolicy or Nnef_SlicePolicy Authorization.

In certain embodiments, in the request to the network the AF 916 may use at least one of the parameters UE-ID(s) (e.g., GPSIs), App ID (e.g., AF ID like App1), AllowAppControl, network slice ID(s) (e.g., ENSI(s), S-NSSAI(s)). The parameter AllowAppControl may indicate that the AF 916 requests the network to enable the application-level request for network slice preference. The parameter network slice ID(s) may indicate the network slice preference to be used for the App ID.

In a third communication 924, if the information received in step 922 is to be stored in the application subscription data, the NEF 914 selects a corresponding UDR serving the App ID and sends the information to the UDR.

In some embodiments, if the information received in step 922 is to be stored in subscriber-specific subscription data, the NEF 914 selects UDR using the GPSI (or corresponding subscription permanent identifier ("SUPI")) and sends the information to the UDR.

In various embodiments, the NEF 914 may use UDM or UDR services to send an application request to the UDM/UDR 910. For example, if the AF 916 request is to be stored in the application subscription data in the UDR, the NEF 914 may use a new service offered by the UDR, e.g., called Nudm_SlicePolicy which may contain at least one of the parameters UE ID, App ID (AF ID), network slice ID (e.g., ENSI/S-NSSAI). The UE ID may be either an external ID (e.g., GPSI) or subscriber ID (e.g., SUPI). The network slice ID may be an external ID (e.g., ENSI) and may need to be translated into ID used in the network (e.g., S-NSSAI). The translation of the ENSI to S-NSSAI may be done in the NEF 914, or in the UDR. The NEF 914 or the UDR may use configuration information from the OAM 912 system (e.g., corresponding to the service level agreement ("SLA")) to be able to map the ENSI to S-NSSAI.

If the PCF 908 has subscribed to be notified about changes of the application subscription data or user subscription data, the UDR may send the information to the PCF 908.

In a fourth communication 926, if the AF 916 is able to communicate with the PCF 908 via a direct N5 interface, the AF 916 may send the information as described in step 922 to the PCF 908.

In a fifth communication 928, the network (e.g., NEF 914) may send a response to the AF 916 including the result of the request from step 922.

For example, if the exchange is via the NEF 914, the NEF 914 may send Nnef_SlicePolicy_Authorization response containing at least one of the parameters UE-IDs (e.g., GPSIs), App ID (e.g., AF ID), AllowAppControl, network slice ID(s) (e.g., ENSIs, S-NSSAI(s)). The parameter AllowAppControl may include a result from the network about whether the application-level request for network slice preference is allowed. In addition, the network may send a list of slice IDs (e.g., ENSIs or S-NSSAIs) for which the application-level control is allowed. For example, the list of slice IDs (e.g., ENSIs or S-NSSAIs) may include all or a subset of network slices that are subscribed to be used by the AF 916 (e.g., acting as network slice customer or subscriber).

In a sixth communication 930, once the AF 916 has obtained the acknowledgement from the network to allow the feature that HL 902 is allowed and/or enabled to request a network slice and the purpose of use (e.g., in step 928), the AF 916 may use application-level signaling to update the HL 902 client in the UE 904 as described in FIG. 7. The application-level signaling may carry one of the instructions and/or configurations corresponding to the examples in corresponding to step 920.

In a seventh communication 932, the UDM 910 may use the UE parameter update ("UPU") procedure to configure the UE 904 with the NSCI-HLP information. For this purpose, the UPU procedure may carry the NSCI-HLP information. The UE 904 (e.g., ME part of the UE 904) receives and stores the NSCI-HLP information. In addition, the NSCI-HLP information may be identified by an HL 902 client ID.

In some embodiments, for any request from the HL 902 client, the UE 904 may compare whether the HL 902 client ID (e.g., application ID) maps to the HL 902 client ID stored received from the UDM 910. If the HL 902 client ID matches, the UE 904 may apply the NSCI-HLP information before the HL 902 request is further processed in the URSP or in the NAS layer.

In an eighth communication 934, the UDM 910 may send the NSCI-HLP information as part of the UE subscription data to the AMF 906. The AMF 906 may send the NSCI-HLP information to the UE 904 via one of the following procedures: 1) using a registration request procedure, the AMF 906 may send the new NSCI-HLP information (e.g., HL 902 layer is allowed to set a slice preference) associated with a HL 902 client ID to the UE 904 included in a registration accept message. For example, the AMF 906 may obtain the NSCI-HLP information (or a part of it, e.g., the parameter that the HL 902 is allowed to set a slice preference) from the UDM during the subscription data retrieval procedure.

In various embodiments, using a UE configuration update ("UCU") procedure, the AMF 906 may send the new NSCI-HLP information (or a part of it, e.g., the parameter that the HL 902 is allowed to set a slice preference) associated with a HL 902 client ID in a configuration update command message. Similarly, as in the registration procedure, the AMF 906 may learn this information from the UDM 910 during a notification that the subscription data has been updated.

For any request from the HL 902 client, the UE 904 may compare whether the HL 902 client ID (e.g., application ID) maps to the HL 902 client ID stored received from the UDM 910. If the HL 902 client ID matches, the UE 904 may apply the NSCI-HLP information before the HL 902 request is further processed in the URSP or in the NAS session management ("SM") layer.

In a ninth communication 936, the PCF 908 may receive new or update application policy rules including the NSCI-HLP information (e.g., from the application subscription data in the UDR 910; or directly from the AF 916). The PCF 908 may be the one responsible for creating and updating the UE policy configuration (e.g., the URSP rules) with the network slice configuration information for high layer preference (e.g., NSCI-HLP). Such PCF 908 may be called AM-PCF. The AM-PCF may trigger a procedure for updating the UE policy, whereby new or updated URSP rules may be sent to the UE 904. The URSP rule(s) (identified by TD) may contain NSCI-HLP information. For example, the RSD part of the URSP rules may contain the NSCI-HLP information. Please note that the NSCI-HLP information included in the URSP rule (i.e., UE NSCI-HLP) may not be exactly the NSCI-HLP information stored in the UDM/UDR (i.e., network NSCI-HLP), i.e., the AM-PCF may use the network NSCI-HLP from the UDM/UDR and create UE NSCI-HLP which is to be sent to the UE.

In certain embodiments, the delivery of the UE policy may use the existing procedure "UE Configuration Update procedure for transparent UE Policy delivery".

Certain benefits of the solution, such as in FIG. 9, may include that the network may (1) negotiate with the AF 916 about whether to activate and/or deactivate the "network slice preference" service from HL 902 client and (2) correspondingly control and/or configure the behavior of the UE 904, e.g., whether the UE 904 is enabled to accept the HL 902 request for slice preference.

Figure 10:
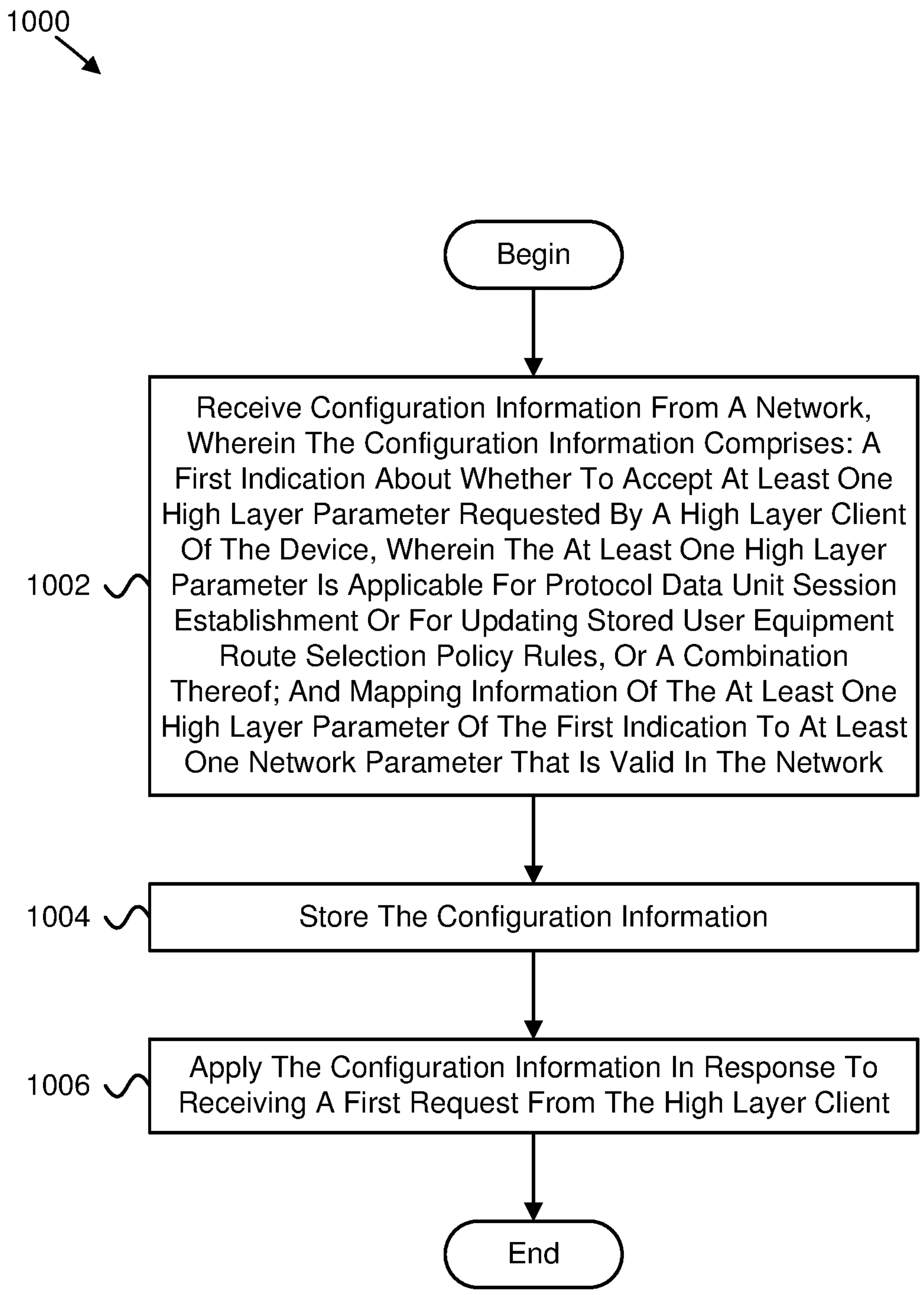
FIG. 10 is a flow chart diagram illustrating one embodiment of a method for configuring protocol data unit sessions.

FIG. 10 is a flow chart diagram illustrating one embodiment of a method 1000 for configuring protocol data unit sessions. In some embodiments, the method 1000 is performed by an apparatus, such as the remote unit 102 or the network unit 104. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 configuration information from a network. The configuration information includes: a first indication about whether to accept at least one high layer parameter requested by a high layer client of the device, wherein the at least one high layer parameter is applicable for protocol data unit session establishment or for updating stored user equipment route selection policy rules, or a combination thereof; and mapping information of the at least one high layer parameter of the first indication to at least one network parameter that is valid in the network. In some embodiments, the method 1000 includes storing 1004 the configuration information. In certain embodiments, the method 1000 includes applying 1006 the configuration information in response to receiving a first request from the high layer client.

In certain embodiments, the method 1000 further comprises receiving the first request from the high layer client comprising at least one parameter of the at least one high layer parameters, the at least one parameter comprising: at least one network slice identity, at least one first data network name, or a combination thereof; a request to establish a connection or to update the user equipment route selection policy rules; or a combination thereof.

In some embodiments, the method 1000 further comprises mapping the at least one high layer parameter to the at least one network parameter using the mapping information. In various embodiments, the method 1000 further comprises transmitting a second request to the network for establishing a first protocol data unit session that includes an establishment parameter, wherein the establishment parameter comprises a selected parameter of the at least one high layer parameter or a mapped parameter of the at least one network parameter.

In one embodiment, the method 1000 further comprises using the establishment parameter for one-time establishment of a second protocol data unit session or for a user equipment route selection policy rules update. In certain embodiments, the device is configured to switch between the first protocol data unit session and the second protocol data unit session based on a trigger. In some embodiments, the second request to the network is transmitted in response to the first request comprising information indicating the at least one network slice, the at least one first data network name, or the combination thereof and the indication about whether to accept the at least one network slice, the at least one first data network name, or the combination thereof is set to accept.

In various embodiments, the configuration information is received as part of: a non-access stratum message from an application and mobility management function; a user equipment route selection policy from a policy control function; a user equipment parameter update message from a unified data management; or a combination thereof. In one embodiment, the device comprises a user equipment. In certain embodiments, the device comprises a network layer, and the device is part of a communication system.

Figure 11:
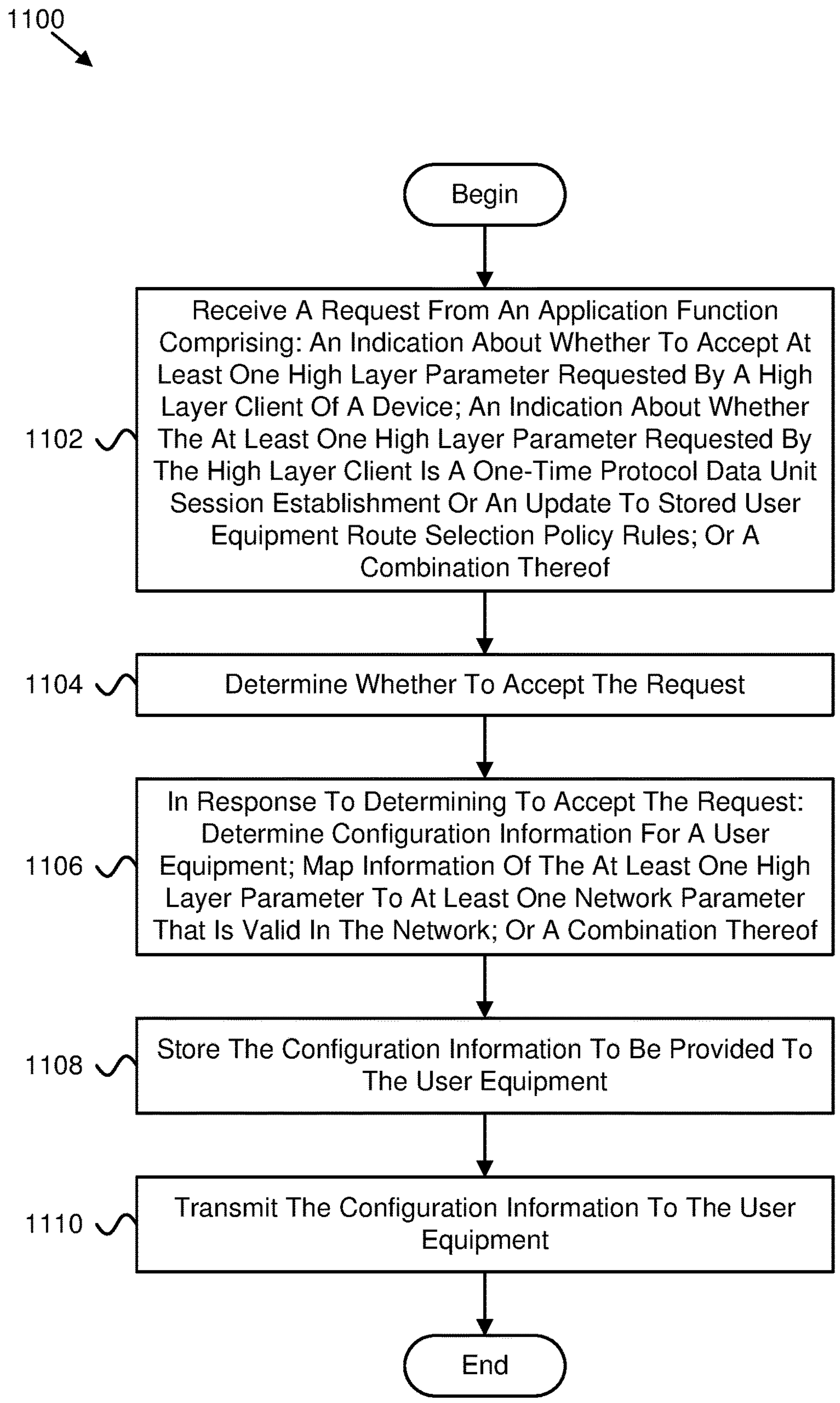
FIG. 11 is a flow chart diagram illustrating another embodiment of a method for configuring protocol data unit sessions.

FIG. 11 is a flow chart diagram illustrating another embodiment of a method 1100 for configuring protocol data unit sessions. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes receiving 1102 a request from an application function including: an indication about whether to accept at least one high layer parameter requested by a high layer client of a device; an indication about whether the at least one high layer parameter requested by the high layer client is a one-time protocol data unit session establishment or an update to stored user equipment route selection policy rules; or a combination thereof. In some embodiments, the method 1100 includes determining 1104 whether to accept the request. In certain embodiments, the method 1100 includes, in response to determining to accept the request: determining configuration information for a user equipment; mapping 1106 information of the at least one high layer parameter to at least one network parameter that is valid in the network; or a combination thereof. In various embodiments, the method 1100 includes storing 1108 the configuration information to be provided to the user equipment. In some embodiments, the method 1100 includes transmitting 1110 the configuration information to the user equipment.

In certain embodiments, the configuration information is transmitted as part of: a non-access stratum message from an application and mobility management function; a user equipment route selection policy from a policy control function; a user equipment parameter update message from a unified data management; or a combination thereof. In some embodiments, the network function comprises a unified data management, a unified data repository, a policy control function, or a combination thereof of the network.

In various embodiments, the at least one high layer parameter comprises an indication of a network slice, an indication of at least one first data network name, or a combination thereof. In one embodiment, the at least one network parameter comprises single network slice selection assistance information, an indication of at least one second data network name, or a combination thereof.

In one embodiment, a method of a device comprises: receiving configuration information from a network, wherein the configuration information comprises: a first indication about whether to accept at least one high layer parameter requested by a high layer client of the device, wherein the at least one high layer parameter is applicable for protocol data unit session establishment or for updating stored user equipment route selection policy rules, or a combination thereof; and mapping information of the at least one high layer parameter of the first indication to at least one network parameter that is valid in the network; storing the configuration information; and applying the configuration information in response to receiving a first request from the high layer client.

In certain embodiments, the method further comprises receiving the first request from the high layer client comprising at least one parameter of the at least one high layer parameters, the at least one parameter comprising: at least one network slice identity, at least one first data network name, or a combination thereof; a request to establish a connection or to update the user equipment route selection policy rules; or a combination thereof.

In some embodiments, the method further comprises mapping the at least one high layer parameter to the at least one network parameter using the mapping information.

In various embodiments, the method further comprises transmitting a second request to the network for establishing a first protocol data unit session that includes an establishment parameter, wherein the establishment parameter comprises a selected parameter of the at least one high layer parameter or a mapped parameter of the at least one network parameter.

In one embodiment, the method further comprises using the establishment parameter for one-time establishment of a second protocol data unit session or for a user equipment route selection policy rules update.

In certain embodiments, the device is configured to switch between the first protocol data unit session and the second protocol data unit session based on a trigger.

In some embodiments, the second request to the network is transmitted in response to the first request comprising information indicating the at least one network slice, the at least one first data network name, or the combination thereof and the indication about whether to accept the at least one network slice, the at least one first data network name, or the combination thereof is set to accept.

In various embodiments, the configuration information is received as part of: a non-access stratum message from an application and mobility management function; a user equipment route selection policy from a policy control function; a user equipment parameter update message from a unified data management; or a combination thereof.

In one embodiment, the device comprises a user equipment.

In certain embodiments, the device comprises a network layer, and the device is part of a communication system.

In one embodiment, an apparatus comprises a device. The apparatus further comprises: a receiver that receives configuration information from a network, wherein the configuration information comprises: a first indication about whether to accept at least one high layer parameter requested by a high layer client of the device, wherein the at least one high layer parameter is applicable for protocol data unit session establishment or for updating stored user equipment route selection policy rules, or a combination thereof; and mapping information of the at least one high layer parameter of the first indication to at least one network parameter that is valid in the network; and a processor that: stores the configuration information; and applies the configuration information in response to receiving a first request from the high layer client.

In certain embodiments, the receiver receives the first request from the high layer client comprising at least one parameter of the at least one high layer parameters, the at least one parameter comprising: at least one network slice identity, at least one first data network name, or a combination thereof; a request to establish a connection or to update the user equipment route selection policy rules; or a combination thereof.

In some embodiments, the processor maps the at least one high layer parameter to the at least one network parameter using the mapping information.

In various embodiments, the apparatus further comprises a transmitter, wherein the transmitter transmits a second request to the network for establishing a first protocol data unit session that includes an establishment parameter, wherein the establishment parameter comprises a selected parameter of the at least one high layer parameter or a mapped parameter of the at least one network parameter.

In one embodiment, the processor uses the establishment parameter for one-time establishment of a second protocol data unit session or for a user equipment route selection policy rules update.

In certain embodiments, the device is configured to switch between the first protocol data unit session and the second protocol data unit session based on a trigger.

In some embodiments, the second request to the network is transmitted in response to the first request comprising information indicating the at least one network slice, the at least one first data network name, or the combination thereof and the indication about whether to accept the at least one network slice, the at least one first data network name, or the combination thereof is set to accept.

In various embodiments, the configuration information is received as part of: a non-access stratum message from an application and mobility management function; a user equipment route selection policy from a policy control function; a user equipment parameter update message from a unified data management; or a combination thereof.

In one embodiment, the device comprises a user equipment.

In certain embodiments, the device comprises a network layer, and the device is part of a communication system.

In one embodiment, a method of a network function comprises: receiving a request from an application function comprising: an indication about whether to accept at least one high layer parameter requested by a high layer client of a device; an indication about whether the at least one high layer parameter requested by the high layer client is a one-time protocol data unit session establishment or an update to stored user equipment route selection policy rules; or a combination thereof; determining whether to accept the request; in response to determining to accept the request: determining configuration information for a user equipment; mapping information of the at least one high layer parameter to at least one network parameter that is valid in the network; or a combination thereof; storing the configuration information to be provided to the user equipment; and transmitting the configuration information to the user equipment.

In certain embodiments, the configuration information is transmitted as part of: a non-access stratum message from an application and mobility management function; a user equipment route selection policy from a policy control function; a user equipment parameter update message from a unified data management; or a combination thereof.

In some embodiments, the network function comprises a unified data management, a unified data repository, a policy control function, or a combination thereof of the network.

In various embodiments, the at least one high layer parameter comprises an indication of a network slice, an indication of at least one first data network name, or a combination thereof.

In one embodiment, the at least one network parameter comprises single network slice selection assistance information, an indication of at least one second data network name, or a combination thereof.

In one embodiment, an apparatus comprises a network function of a network. The apparatus further comprises: a receiver that receives a request from an application function comprising: an indication about whether to accept at least one high layer parameter requested by a high layer client of a device; an indication about whether the at least one high layer parameter requested by the high layer client is a one-time protocol data unit session establishment or an update to stored user equipment route selection policy rules; or a combination thereof; a processor that: determines whether to accept the request; in response to determining to accept the request: determines configuration information for a user equipment; maps information of the at least one high layer parameter to at least one network parameter that is valid in the network; or a combination thereof; and stores the configuration information to be provided to the user equipment; and a transmitter that transmits the configuration information to the user equipment.

In certain embodiments, the configuration information is transmitted as part of: a non-access stratum message from an application and mobility management function; a user equipment route selection policy from a policy control function; a user equipment parameter update message from a unified data management; or a combination thereof.

In some embodiments, the network function comprises a unified data management, a unified data repository, a policy control function, or a combination thereof of the network.

In various embodiments, the at least one high layer parameter comprises an indication of a network slice, an indication of at least one first data network name, or a combination thereof.

In one embodiment, the at least one network parameter comprises single network slice selection assistance information, an indication of at least one second data network name, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving configuration information from a network, wherein the configuration information comprises:

a first indication about whether to accept at least one high layer parameter requested by a high layer client of the UE, wherein the at least one high layer parameter is applicable for protocol data unit session establishment or for updating stored UE route selection policy rules, or a combination thereof; and mapping information of the at least one high layer parameter of the first indication to at least one network parameter that is valid in the network;

storing the configuration information;

receiving a first request from the high layer client comprising the at least one high layer parameter; and applying the configuration information in response to receiving the first request from the high layer client, wherein applying the configuration information comprises using the first indication and the mapping information with respect to the at least one high layer parameter from the first request to establish a protocol data session or to update stored UE route selection policy rules using at least one network parameter that is valid in the network.

2. A user equipment (UE), comprising:

at least one memory; and at least one processor coupled with the at least one memory and configured to cause the UE to:

receive configuration information from a network, wherein the configuration information comprises:

a first indication about whether to accept at least one high layer parameter requested by a high layer client of the UE, wherein the at least one high layer parameter is applicable for protocol data unit session establishment or for updating stored UE route selection policy rules, or a combination thereof; and mapping information of the at least one high layer parameter of the first indication to at least one network parameter that is valid in the network;

store the configuration information;

receive a first request from the high layer client comprising the at least one high layer parameter; and apply the configuration information in response to receiving a first request from the high layer client, wherein applying the configuration information comprises using the first indication and the mapping information with respect to the at least one high layer parameter from the first request to establish a protocol data unit session or to update stored UE route selection policy rules using at least one network parameter that is valid in the network.

3. The UE of claim 2, wherein the at least one processor is configured to cause the UE to receive the first request from the high layer client comprising at least one parameter of the at least one high layer parameters, the at least one parameter comprising:

at least one network slice identity, at least one first data network name, or a combination thereof;

a request to establish a connection or to update the UE route selection policy rules;

or a combination thereof.

4. The UE of claim 3, wherein the at least one processor is configured to cause the UE to map the at least one high layer parameter to the at least one network parameter using the mapping information.

5. The UE of claim 3, wherein the at least one processor is configured to cause the UE to transmit a second request to the network for establishing a first protocol data unit session that includes an establishment parameter, and wherein the establishment parameter comprises a selected parameter of the at least one high layer parameter or a mapped parameter of the at least one network parameter.

6. The UE of claim 5, wherein the at least one processor is configured to cause the UE to use the establishment parameter for one-time establishment of a second protocol data unit session or for a UE route selection policy rules update.

7. The UE of claim 6, wherein the UE is configured to switch between the first protocol data unit session and the second protocol data unit session based on a trigger.

8. The UE of claim 5, wherein the second request to the network is transmitted in response to the first request comprising information indicating the at least one network slice, the at least one first data network name, or the combination thereof and the indication about whether to accept the at least one network slice, the at least one first data network name, or the combination thereof is set to accept.

9. The UE of claim 2, wherein the configuration information is received as part of:

a non-access stratum message from an application and mobility management function;

a UE route selection policy from a policy control function;

a UE parameter update message from a unified data management; or a combination thereof.

10. The UE of claim 2, wherein the UE comprises a network layer, and the UE is part of a communication system.

11. An apparatus for performing a network function, the apparatus comprising:

at least one memory; and at least one processor coupled with the at least one memory and configured to cause the apparatus to:

receive a request from an application function comprising:

an indication about whether to accept at least one high layer parameter requested by a high layer client of a user equipment (UE);

an indication about whether the at least one high layer parameter requested by the high layer client is a one-time protocol data unit session establishment or an update to stored UE route selection policy rules;

or a combination thereof;

determine whether to accept the request;

in response to determining to accept the request:

determine configuration information for a UE;

map information of the at least one high layer parameter requested by the high layer client to at least one network parameter that is valid in the network;

or a combination thereof;

store the configuration information to be provided to the UE; and transmit the configuration information to the UE, wherein the configuration information comprises the indication about whether to accept the at least one high layer parameter to at least one network parameter that is valid in the network.

12. The apparatus of claim 11, wherein the configuration information is transmitted as part of:

a non-access stratum message from an application and mobility management function;

a UE route selection policy from a policy control function;

a UE parameter update message from a unified data management; or a combination thereof.

13. The apparatus of claim 11, wherein the network function comprises a unified data management (UDM), a unified data repository (UDR), a policy control function (PCF), or a combination thereof of the network.

14. The apparatus of claim 11, wherein the at least one high layer parameter comprises an indication of a network slice, an indication of at least one first data network name, or a combination thereof, and the at least one network parameter comprises single network slice selection assistance (S-NSSAI) information, an indication of at least one second data network name, or a combination thereof.

15. A processor for wireless communication, comprising:

at least one controller coupled with at least one memory and configured to cause the processor to:

receive configuration information from a network, wherein the configuration information comprises:

a first indication about whether to accept at least one high layer parameter requested by a high layer client of a user equipment (UE), wherein the at least one high layer parameter is applicable for protocol data unit session establishment or for updating stored UE route selection policy rules, or a combination thereof; and mapping information of the at least one high layer parameter of the first indication to at least one network parameter that is valid in the network;

store the configuration information;

receive a first request from the high layer client comprising the at least one high layer parameter; and apply the configuration information in response to receiving a first request from the high layer client, wherein applying the configuration information comprises using the first indication and the mapping information with respect to the at least one high layer parameter from the first request to establish a protocol data unit session or to update stored UE route selection policy rules using at least one network parameter that is valid in the network.

16. The processor of claim 15, wherein the at least one controller is configured to cause the processor to receive the first request from the high layer client comprising at least one parameter of the at least one high layer parameters, the at least one parameter comprising:

at least one network slice identity, at least one first data network name, or a combination thereof;

a request to establish a connection or to update the UE route selection policy rules;

or a combination thereof.

17. The processor of claim 16, wherein the at least one controller is configured to cause the processor to map the at least one high layer parameter to the at least one network parameter using the mapping information.

18. The processor of claim 16, wherein the at least one controller is configured to cause the processor to transmit a second request to the network for establishing a first protocol data unit session that includes an establishment parameter, wherein the establishment parameter comprises a selected parameter of the at least one high layer parameter or a mapped parameter of the at least one network parameter.

19. The processor of claim 18, wherein the at least one controller is configured to cause the processor to use the establishment parameter for one-time establishment of a second protocol data unit session or for a UE route selection policy rules update.

20. The processor of claim 19, wherein the UE is configured to switch between the first protocol data unit session and the second protocol data unit session based on a trigger.

* * * * *